United States Patent
Hatch et al.

(10) Patent No.: US 8,682,803 B2
(45) Date of Patent: Mar. 25, 2014

(54) ENABLING COMMUNICATION BETWEEN, AND PRODUCTION OF CONTENT BY, RIGHTS HOLDERS AND CONTENT PRODUCERS

(75) Inventors: Steven Hatch, West Orange, NJ (US); Donald R. Katz, Montclair, NJ (US); Guy A. Story, Jr., Manhattan, NY (US); Jason Ojalvo, Brooklyn, NY (US); Kavin Du, Manhattan, NY (US); David Reid, Hoboken, NY (US); Michael M. George, Mercer Island, WA (US)

(73) Assignee: Audible, Inc., Newark, NJ (US)

( * ) Notice: Subject to any disclaimer, the term of this patent is extended or adjusted under 35 U.S.C. 154(b) by 373 days.

(21) Appl. No.: 13/011,703

(22) Filed: Jan. 21, 2011

(65) Prior Publication Data

US 2012/0116979 A1    May 10, 2012

Related U.S. Application Data

(60) Provisional application No. 61/411,815, filed on Nov. 9, 2010.

(51) Int. Cl.
*G06Q 10/00* (2012.01)
(52) U.S. Cl.
USPC .............................. 705/80; 705/310
(58) Field of Classification Search
USPC ..................... 705/1.1, 80, 310, 500
See application file for complete search history.

(56) References Cited

U.S. PATENT DOCUMENTS

| | | | |
|---|---|---|---|
| 7,739,238 B2 | 6/2010 | Strickland | |
| 2005/0276570 A1* | 12/2005 | Reed et al. | 386/46 |
| 2007/0050366 A1 | 3/2007 | Bugir et al. | |
| 2008/0154739 A1* | 6/2008 | Kalaboukis | 705/26 |
| 2008/0209502 A1* | 8/2008 | Seidel | 726/1 |
| 2008/0263433 A1* | 10/2008 | Eppolito et al. | 715/200 |
| 2009/0100020 A1* | 4/2009 | Reddy et al. | 707/3 |
| 2011/0125653 A1* | 5/2011 | Ciccarelli | 705/80 |

OTHER PUBLICATIONS

International Search Report dated Mar. 23, 2012 received in PCT Application PCT/USS11/59802.

* cited by examiner

*Primary Examiner* — Scott A Mattia
(74) *Attorney, Agent, or Firm* — Knobbe, Martens, Olson and Bear, LLP

(57) ABSTRACT

A content exchange service facilitates communication between, and production of content by, holders of rights in content titles and producers of content. The content exchange service receives content profiles from various rights holders and surfaces the content profiles to producers for purposes of soliciting auditions to produce the content subject of the content profiles in an alternative form. The rights holder can review the auditions submitted by producers and establish communication with the producer of the audition the rights holder liked via the content exchange service. The content exchange service can then facilitate negotiation of an agreement between the rights holder and the producer for production of the content in an alternative form. Following finalization of the agreement, the producer may submit a complete production of the content in the alternative form to the content exchange service, which in turn presents the complete production to the rights holder for approval.

36 Claims, 19 Drawing Sheets

FILE  EDIT  VIEW  FAVORITES  TOOLS  HELP

USERNAME |LOGOUT| | SETTINGS | PROFILE    SEARCH FOR...  ▼ JOHN SMITH    GO

*MY LIFE IN A NUTSHELL, BY JOHN SMITH*

HOW MANY WORDS IN "MY LIFE IN A NUTSHELL"    THIS FINISHED AUDIOBOOK WILL BE ABOUT
[28,200]  — 334                                3 HOURS LONG
RE-CALCULATE   (AVERAGE IS 9,400 WORDS PER FINISHED HOUR)

HOW MUCH WILL YOU PAY PRODUCER TO PRODUCE THIS TITLE?

ROYALTY ONLY              HOURLY RATE  — 336
○ 10% ROYALTY SHARE  OR   $ [75]   PER FINISHED HOUR
          339                      (3 HRS @ $75/HR = $225)
                          RE-CALCULATE

WHAT TYPE OF DISTRIBUTION/ROYALTY DO YOU WANT?  — 338
○ EXCLUSIVE TO THE CONTENT EXCHANGE
  (HIGHER ROYALTIES)
○ NON-EXCLUSIVE  — 343

DO YOU WANT THE CONTENT EXCHANGE TO MAKE AND DISTRIBUTE A CD OF THIS AUDIOBOOK?
○ YES
○ NO  — 340

3. TERMS OF PAYMENT  — 337

( CONTINUE )  — 341
    338
CANCEL    SKIP THIS

*Fig. 3C.*

ENABLING COMMUNICATION BETWEEN, AND PRODUCTION OF CONTENT BY, RIGHTS HOLDERS AND CONTENT PRODUCERS

BACKGROUND

Electronic commerce is an increasingly popular method of conducting business and selling items. Providers of goods and services ("items") are able to efficiently offer and sell a wide variety of items over computer networks, including the Internet. This enables some to reach a market that may not be otherwise available or accessible. For example, a holder of rights (e.g., an author) in printed content (e.g., a book) may offer her content for sale or access to users through various electronic commerce resources available via the Internet. However, in order to reach a larger audience and/or meet consumer demand, a rights holder often seeks to make his content available in an alternative form. For example, printed content such as a book originally offered in physical form or electronic book ("e-book") form, may be alternative offered in audio book form. However, since much of the printed content available in physical or e-book form is not available in audio book form or in audio book form with high quality narration, rights holders often find it difficult to reach a larger audience and/or meet the consumer demand for audio books.

Moreover, getting one's printed content produced in audio form can be difficult. Traditionally, the production of printed content in audio book form requires a fairly time consuming, expensive and manual process for auditioning and selecting narrators, finalizing a production agreement between the rights holder and the narrator, and producing an audio book with studio quality narration. In addition, it can be difficult to determine who controls the rights to produce the printed content in audio book form, as well as which printed content has or has not been produced as an audio book.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 3A-3D depict illustrative user interfaces presented to a rights holder for prompting input of data into a content profile for a content title that the rights holder wishes to have produced in an alternative form;

DETAILED DESCRIPTION

Figure 1:
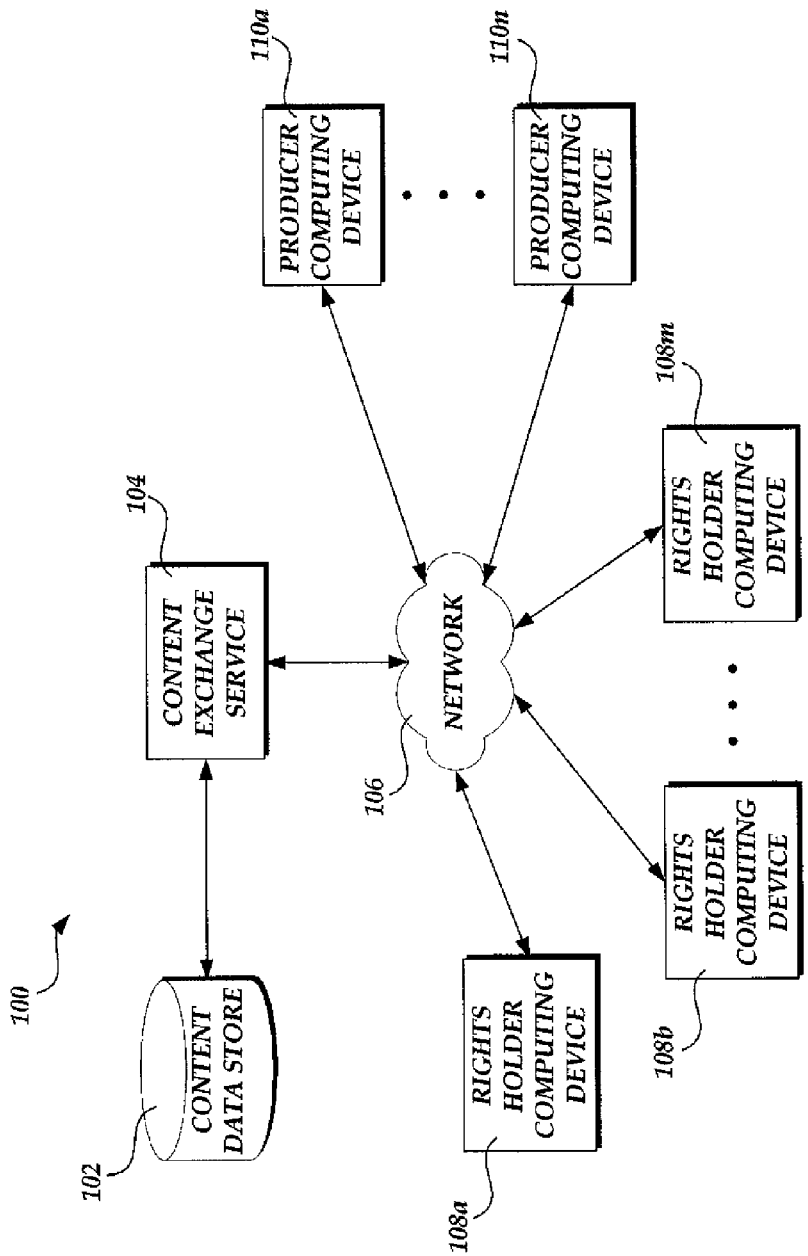
FIG. 1 is a block diagram of an illustrative operating environment for facilitating communication between, and production of content by, a holder of rights in a content title and a producer.

Generally described, aspects of the present disclosure relate to a content exchange service that facilitates communication between, and production of content by, holders of rights in content titles and producers of content. The content exchange service receives content profiles from various rights holders and surfaces the content profiles to producers for purposes of soliciting auditions to produce the content subject of the content profiles in an alternative form. In addition, the content exchange service receives producer profiles from various producers and surfaces the producer profiles to rights holders for purposes of introducing to rights holders those producers who may be capable of producing the rights holder's content in an alternative form. In other embodiments, producers submit bids to the rights-holder in an auction for the opportunity to produce the rights holder's content in an alternative form. Each bid may include a cost for producing the content in the alternate form, as well as an audition for producing the content.

Once a producer has submitted an audition for producing a rights holder's content in an alternative form, the rights holder can easily review the auditions and establish communication with the producer of an audition the rights holder liked via the content exchange service. In the auction context, the rights holder can establish communication with the producer who submitted the winning bid. In one embodiment, the winning bid may be the bid with the lowest cost for producing the work in alternative form. However, in other embodiments, the rights holder or the content exchange service may decide the winning based on other or additional criteria, e.g., narrator experience, voice attributes, producer's production history, etc. In yet other embodiments, only those producers who meet the rights holder's requirements for production may be allowed to submit bids. In such embodiments, the producer with the lowest bid may be selected.

Once a producer is selected, the content exchange service can facilitate negotiation of a production agreement between the rights holder and the producer for production of the content in an alternative form. Following finalization of the production agreement, the producer may submit a complete production of the content in the alternative form to the content exchange service, which in turn presents the complete production to the rights holder for approval. Once approved, the content exchange service may add the production of the content in alternative from to an electronic catalog of content and/or other items for future sale or access.

In one practical application of the content exchange service, the content to be produced in an alternative form is a book originally in physical or e-book form. Using the content exchange service as described herein, a rights holder in the book in its original form may submit a content profile for the book to the content exchange service, receive auditions from one or more producers to produce the book in audio book form based on the book's content profile, and make an offer for full production of the book in audio book form to one of the producers who submitted an audition that the rights holder liked. The content exchange service may forward the offer to the producer, and if accepted by the producer, facilitate negotiation of a production agreement between the rights holder and the producer for production of book in audio book form. Following finalization of the production agreement, the producer may submit a complete production of the content in audio book form to the content exchange service, which in turn presents the complete production to the rights holder for approval. Once approved, the content exchange service may add the completed audio book to an electronic catalog of content and/or other items so that the audio book may be made available for sale or access, e.g., a retail Web site.

Although the above practical application of the content exchange service is described in the context of producing an e-book or physical book in audio book form, those skilled in the art will recognize that the content exchange service may be utilized to facilitate production of virtually any type of content in an alternative form. For example, the content may be music, articles, films, video games, images, computer software, and the like in digital or physical form and the alternative forms for such content may include, but not be limited to, multi-media form, video form, digital (versus analog) form, etc. Accordingly, the example set forth above (and again below) of producing an e-book or physical book in audio book form is merely illustrative and should not be construed as limiting. Moreover, as used herein, the term "content title" may be used interchangeably with the term "content."

In addition, a rights holder can be any individual or entity that controls the rights for producing the content in an alternative form. Therefore, the rights holder may be a creator or author of the content, an owner of the content, a publisher of the content, a record label, etc. or an agent (or other representative) thereof. A producer, on the other hand, can be any individual or entity capable of producing the content in an alternative form. For example, a producer may be a narrator, an actor, an artist, a software developer, a designer, a production company, a studio, etc. or an agent (or other representative thereof). In some instances, the producer may be the author or creator of the content herself. Accordingly, the author or creator may produce the content in an alternative form as described in the present disclosure. Rights holders and producers may each subscribe to and maintain an account the content exchange service 104. Accordingly, a rights holder or producer with an account may assign subaccounts to agents, employees, or other representatives of the rights holder or producer, respectively, who may then utilize the content exchange service 104 on behalf of the rights holder or producer, respectively.

FIG. 1 is a pictorial diagram of an illustrative networked operating environment 100 in which communication between, and production of content by, rights holders and producers is facilitated by a content exchange service 104. As will be described in more detail below, pertinent data regarding content that may be produced in an alternative form can be made available to one or more potential producers via producer computing devices 110*a*-110*n*. Such producers may then submit auditions (also referred to herein as "sample productions") or bids to produce the content in alternative form. If a rights holder likes an audition or when a winning bid is determined, the rights holder and the producer who submitted the audition may enter a production agreement for producing the content in an alternative form. Upon approval by the rights holder of a complete production of the content in alternative form, the content exchange service may add the production into an electronic catalog so that it may be made available for sale or other access via a retail or library access Web site, or for sale or access in a brick and mortar store.

The environment 100 shown in FIG. 1 includes a content exchange service 104 that facilitates communication between one or more rights holder computer devices 108*a*-108*m* (each used by a rights holder) and one or more producer computing devices 110*a*-110*n* (each used by a producer) via computer network 106. The rights holder computer devices 108*a*-108*m* and producer computing devices 110*a*-110*n* may be any computing device that is capable of communicating over computer network 106, such as a laptop or tablet computer, personal computer, personal digital assistant (PDA), hybrid PDA/mobile phone, mobile phone, electronic book reader, set-top box, camera, digital media player, and the like. In one embodiment, the rights holder computer devices 108*a*-108*m* and producer computing devices 110*a*-110*n* communicate with the content exchange service 104 via a communication network 106, such as the Internet or a communication link. Those skilled in the art will appreciate that the network 106 may be any wired network, wireless network or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The content exchange service 104 may be embodied in a plurality of components, each executing an instance of the content exchange service. A server or other computing component implementing the content exchange service 104 may include a network interface, memory, processing unit, and computer readable medium drive, all of which may communicate with one another by way of a communication bus. The network interface may provide connectivity over the network 106 and/or other networks or computer systems. The processing unit may communicate to and from memory containing program instructions that the processing unit executes in order to operate the content exchange service 104. The memory generally includes RAM, ROM, and/or other non-transitory, persistent and auxiliary computer-readable storage media.

As noted above, the content exchange service 104 may receive data regarding a rights holder's content (herein "a content profile") directly from the rights holder (e.g., from a computing device 108a utilized by a rights holder) or from other network resources, and make the content profile available to producers utilizing computing devices 110a-110n via the network 106. As also noted above, the content exchange service 104 may also receive data regarding a producer (herein "a producer profile") directly from the producer (e.g., from a computing device 110a utilized by a producer) or from other network resources, and make the producer profile available to rights holders utilizing computing devices 108a-108m via the network 106. The content profiles and producer profiles received by the content exchange service 104 may be stored in a centralized content data store 102. For purposes of the present discussion, a "centralized" data store refers to a data store that is capable of storing data received from multiple sources. The centralized data store may be distributed or partitioned across multiple storage devices as is known in the art without departing from the spirit and scope of the present disclosure. Moreover, while the data store 102 is depicted in FIG. 1 as being local to the content exchange service 104, those skilled in the art will appreciate that the data store 102 may be remote to content exchange service 104 and/or may be a network-based service itself.

As described above, the content exchange service 104 may facilitate communication between, and production of content by, rights holders and producers for purposes of surfacing content to potential producers and surfacing potential producers to rights holders. The front-end communication provided by the content exchange service 104 may include generating text and/or graphics, possibly organized as an interface using Hypertext Transfer or other protocols in response to information inquiries received from the rights holder computing devices 108a-108m and/or producer computing devices 110a-110n. Non-limiting examples of such interfaces are shown in FIGS. 3A-3D, 4, 6, 7, 9, 10, 11A-11B and 13-15.

Figure 2:
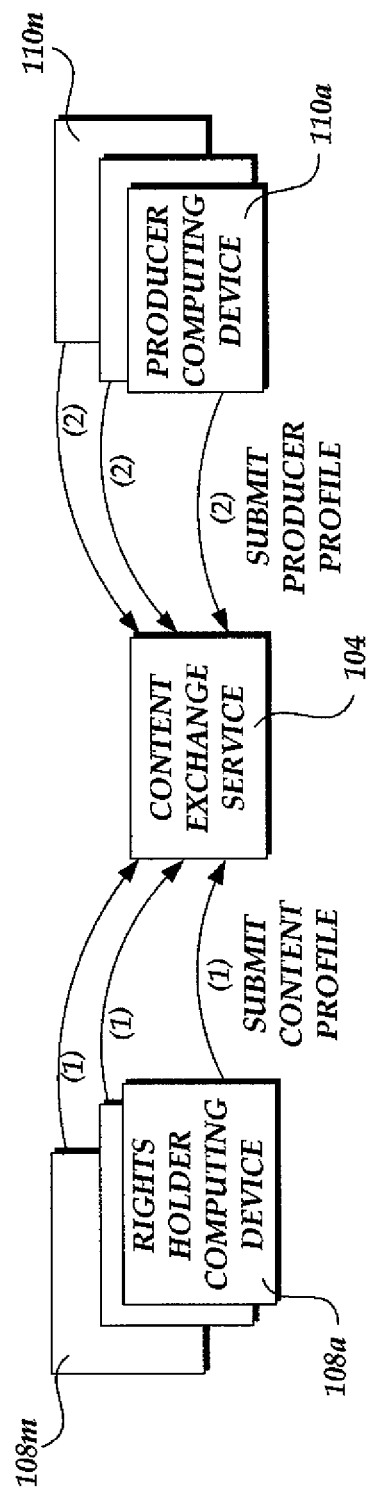
FIG. 2 is a block diagram of the operating environment of FIG. 1, illustrating a content exchange service receiving content profiles from the computing devices of various rights holders and producer profiles from the computer devices of various producers.

FIG. 2 is a block diagram of the operating environment of FIG. 1, illustrating the content exchange service 104 receiving content profiles from the computing devices 108a-108m of various rights holders and producer profiles from the computing devices 110a-110n of various producers. Although not depicted in FIG. 2, those skilled in the art will appreciate that the content profiles and producer profiles are submitted to the content exchange service 103 via the network 106 and stored by the content exchange service 104 in the centralized content data store 102. As noted above, and described in more detail below in connection with FIG. 5, the content exchange service 104 subsequently surfaces the received content profiles to producers for purposes of soliciting auditions or otherwise publicize opportunities to produce the content subject of the content profiles in an alternative form. In addition, the content exchange service 104 may surface the producer profiles to rights holders for purposes of introducing to rights holders those producers who may be capable of producing the rights holder's content in an alternative form.

Figure 3A:
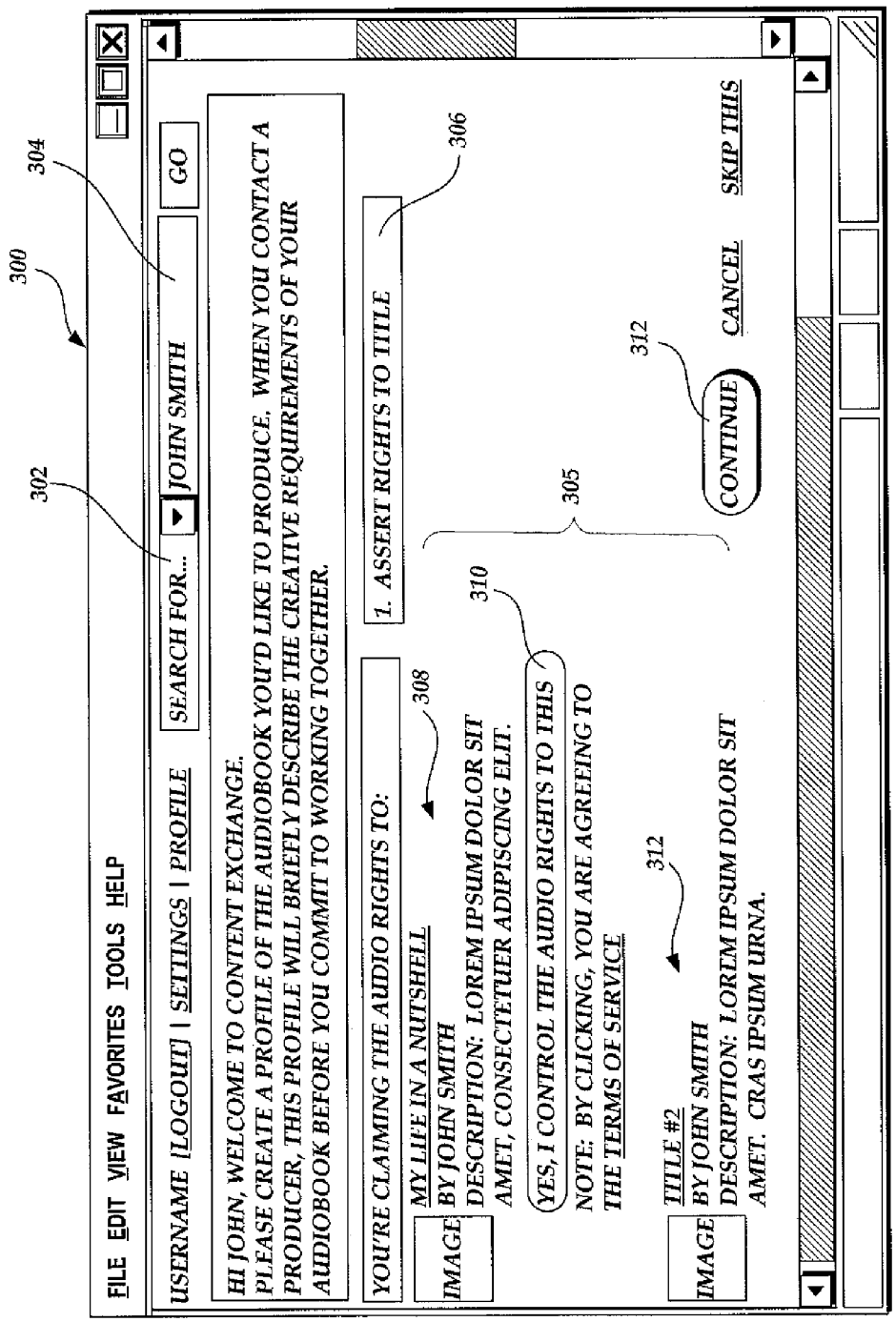
Figure 3B:
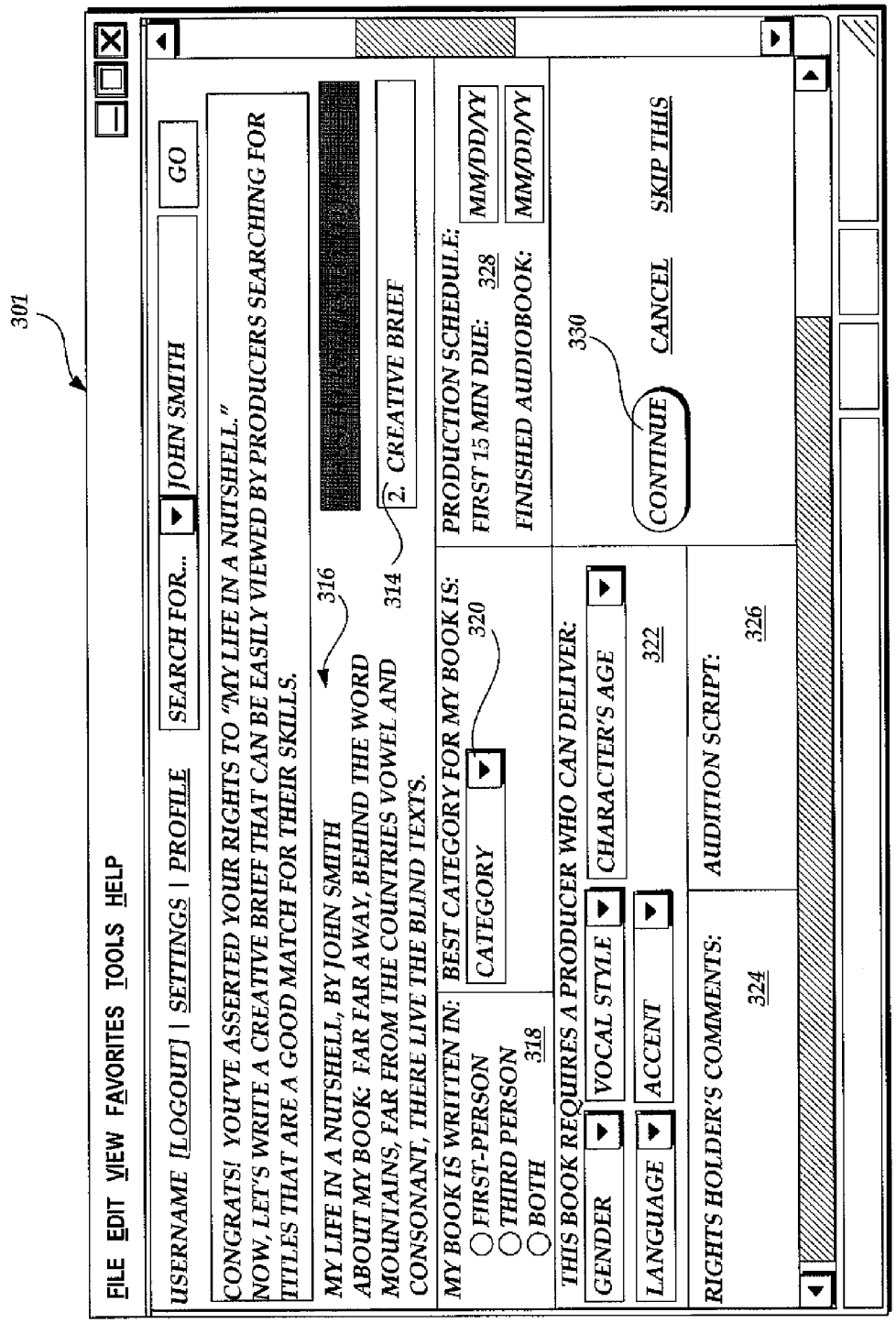

FIGS. 3A-3B depict illustrative user interfaces 300, 301, 303 and 303 for prompting a rights holder to input data into a content profile regarding a content title that the rights holder wishes to have produced in an alternative form. For illustrative purposes, the content is a book (either in physical or e-book form) that the rights holder would like to have produced as an audio book. However, as noted above, those skilled in the art will appreciate that this is a non-limiting example of the application of the content exchange service 104.

As shown in FIG. 3A, the rights holder may select or enter a title of a book 308 or 312 from user interface 300 that she would to have produced in audio book form. As used herein, a "book title" is simply a designation that identifies the book to be produced in audio book form and thus, is often used herein interchangeably with the term "book." Similarly, the term "content title" may be used herein interchangeably with the term "content." A content title could be used to represent content such as a book, a musical recording, a film, a software program, a video game, etc.

In some embodiments a rights holder may have one or several book titles that he wishes to have produced in audio book form. Accordingly, the rights holder may search for book titles in which she controls the rights by selecting a search option 302 from the user interface 300 and entering a search query, such as the rights holder's name, in a search field 304. In response, the content exchange service 104 may conduct a search of the content data store 102 to identify any book titles that may match the search query and present the search results 305 in the user interface 300 for the rights holder's review. In one embodiment, the rights holder must assert that she controls the rights to produce a book title in audio book form in order for the rights holder to submit the content profile for the book to the content exchange server 104. Rather than implementing a time consuming, costly and laborious process to certify or prove that the rights holder controls such rights, the content exchange service 104 may ask that the rights holder affirmatively assert that he controls the rights, e.g., the audio book rights, to the content title by selecting an assertion control 310 and accepting terms of service promulgated by an operator of the content exchange service 104. In addition to, or perhaps in lieu of selection of the assertion control 310 by the rights holder, the content exchange service 104 may confirm that the rights holder controls the rights to produce the book title in audio book form by determining if the book title in its original form (e.g., in physical or e-book form) is available for purchase or other access by a recognized third party network resource, such as a recognized retail Web site. Alternatively, or in addition, the content exchange service 104 may confirm that the rights holder controls the rights to produce the book title as an audio book by comparing the book title to a prohibited list of book titles that are in the public domain in its original form or for which corresponding audio books are already available. In the book title is found in the prohibited list, the rights holder asserting rights to the content title does not, in fact, control the rights to produce the book title in audio book form and will not be allowed to assert such rights by the content exchange service 104. Alternatively, or in addition, the content exchange service 104 may compare the book title to an approved list of books from approved publishers in order to determine if the book title was published in physical or e-book form by a known and established publisher. In such cases, it can be assumed that the book title is in sufficient demand so as to justify producing the content title in audio book form.

Once the rights holder has asserted in user interface 300 that he controls the rights to produce the book title in audio book form, the rights holder may continue constructing the content profile for the book title by selecting a continue control 311 (alternatively, the rights holder may cancel construction of the content profile or skip this portion of constructing the content profile). In this regard, the content exchange service 104 may generate a user interface 301 for presentation to the rights holder utilizing a computing device 108a as shown in FIG. 3B. The user interface 301 prompts the rights holder to construct a creative brief 314 for the book title that specifies one or more requirements that the rights holder desires for production. The creative brief 314 may include a description 316 for the book title as well as a number of fields prompting the rights holder to input one or more requirements for production of the book title in audio book form. For example, for the book "My Life in a Nutshell," the rights holder may indicate in a field 318 the point-of-view in which the book is written (e.g., first person, third person, or both). The rights holder may also input a category or genre for the book by selecting the category or genre from a pull-down menu 320 presented in user interface 301. The rights holder may also indicate one or more vocal requirements 322 desired of a producer, such as gender, vocal style, character's age, language, and accent. In the example illustrated in FIG. 3B, such vocal requirements may be selected by the rights holder from various pull down menus. However, those skilled in the art will appreciate that various prompting and/or input mechanisms may be implemented without departing from the spirit and scope of the present disclosure. Moreover, those skilled in the art will recognize that more, fewer or different vocal requirements may be presented in user interface 301 for selection and/or specified by the rights holder in the content profile for the book.

In addition to the vocal requirements 322, the rights holder may input comments regarding the book title and/or the desired audio book in a field 324 and a script in field 326 to be used by a producer for generating an audition for producing the book as an audio book. The rights holder may also specify a production schedule for producing the audio book by inputting desired deadlines in date fields 328 of the user interface 301. In one embodiment, the production schedule may include at least two deadlines: (1) a date deadline by which the producer must submit a first portion of the audio book (e.g., a first 15 minutes) for review by the rights holder to ensure that she likes the audio book and/or that the audio book is satisfying the terms of the production agreement; and (2) a date deadline by which the producer must submit the completed audio book for review by the rights holder. Once the rights holder inputs the requested data, the rights holder may continue with constructing the content profile for the content title by selecting a continue control 330 in user interface 301 (alternatively, the rights holder may cancel construction of the content profile or skip this portion of constructing the content profile).

Once rights have been asserted in the book and a creative brief has been constructed for the book, the rights holder may specify terms of payment 338 in the content profile for the book via a user interface 303 as shown in FIG. 3C. In one embodiment, the terms of payment may be based upon an hourly rate for production of audio book. Accordingly, the rights holder may input in a field 332 the number of words contained in the book, which in the illustrated example is the book title "My Life in a Nutshell." The content exchange service 104 may then calculate an estimate 334 of the length in hours of the finished audio book based on an average number of words per finished hour. The rights holder may then elect to pay the producer to produce the audio book by inputting an hourly rate in an hourly rate field 336. The content exchange service 104 may then calculate and present a total payment 337 for the producer based on the estimated length in hours of the finished audio book and the hourly rate. Alternatively, the rights holder may elect to pay the producer a royalty share based on the sales of the produced audio book by selecting a royalty share option 339. In the illustrated example, the royalty share used is 10%. However those skilled in the art will recognize that different and/or varying royalty shares may be presented for selection and/or specified by the rights holder via the user interface 303 without departing from the spirit and scope of the present disclosure.

In addition to the amount of payment, the rights holder may also specify what type of distribution or royalty the rights holder wants to implement for the audio book. In the illustrated example, the rights holder may select an option 338 for exclusive distribution of the audio book by the operator of the content exchange service 104 or other party. Accordingly, the rights holder will receive a higher royalty share from the operator of the content exchange service 104 (or other party) for any sales of the audio book by the operator. Alternatively, the rights holder may elect a nonexclusive distribution option 343, in which case the audio book may be distributed by the operator of the content exchange service 104 and others, e.g., a third party retail Web site.

Finally, the rights holder may specify whether he or she wants the operator of the content exchange service 104 to make and distribute a CD-ROM of the audio book. If so, the CD-ROM may be made available for purchase for lending. Once the rights holder has completed specifying the terms of payment 338 for the content title, the rights holder may select a continue control 341 in order to review the content profile that she has constructed (alternatively, the rights holder may cancel construction of the content profile or skip the terms of payment portion 338 of constructing the content profile).

Figure 3D:
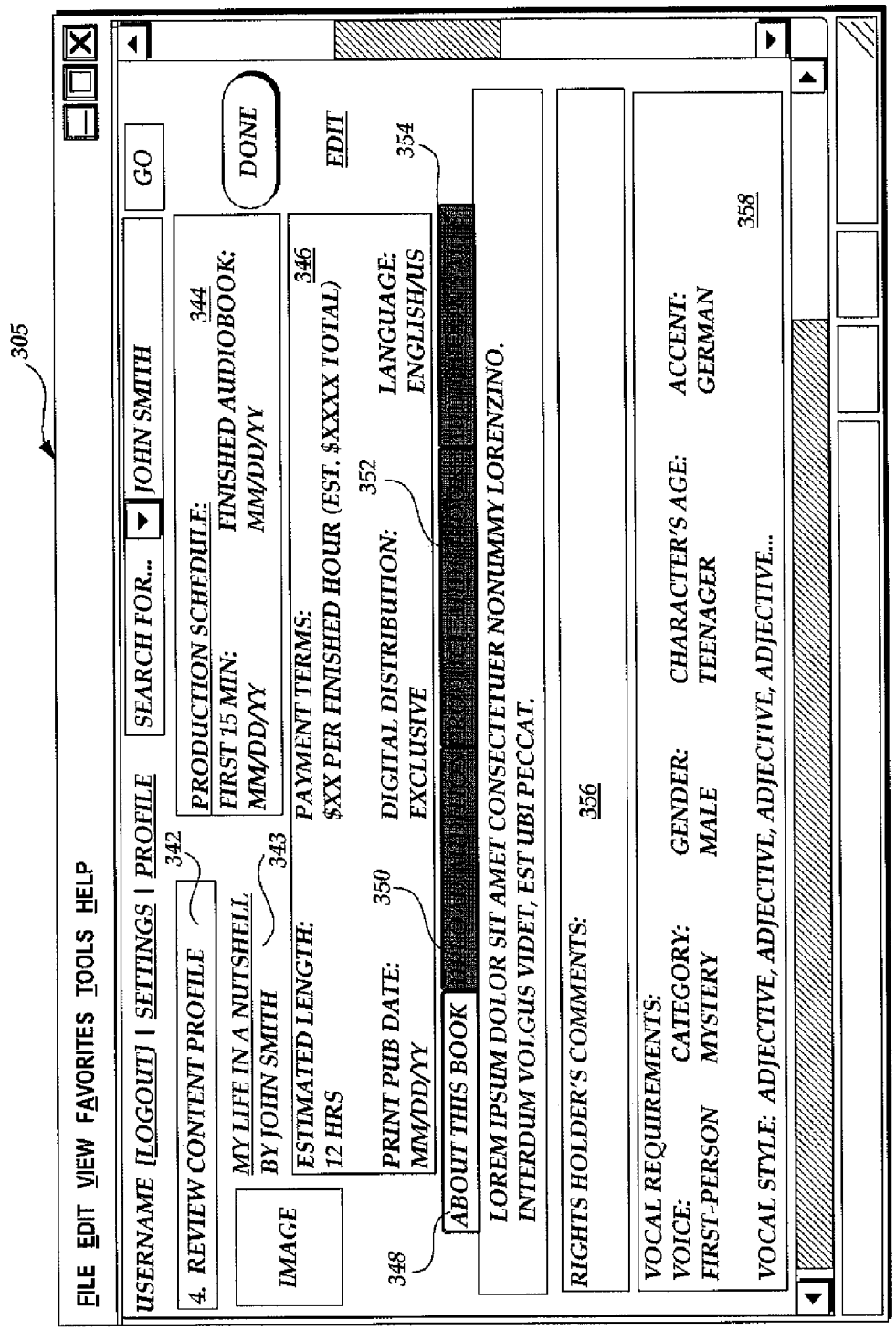

The content exchange service 104 may generate a user interface 305 as illustrated in FIG. 3D for review 342 of the content profile for the book constructed by the rights holder. It will be appreciated by those skilled in the art that the user interface generated by the content exchange service 104 for reviewing the content profile may be provided by the content exchange service to either the rights holder or a producer depending on the context of the review (e.g., review by the rights holder for purposes of confirming editing the content profile or review by a producer for purposes of reviewing the content profile and/or submitting an audition to produce the audio book for the book title). In addition to presenting the book title 343, the user interface 305 may present the production schedule 344 previously specified by the rights holder, as well as any data 346 pertaining to the payment terms 346 that were previously specified by the rights holder. Moreover, the user interface 305 may present an "about this book" tab 348 that includes the rights holder's comments 356 and the vocal requirements for the producer 358; an upload audition tab 350 that instructs and enables a producer to upload an audition for producing the audio book; a produce audio book tab 352 that instructs and enables a producer to upload the completed audio book for review by the rights holder, or that instructs and enables a rights holder to review and approve the completed audio book; and an audio book sales tab 354 that presents a sales summary report for the audio book.

Figure 4:
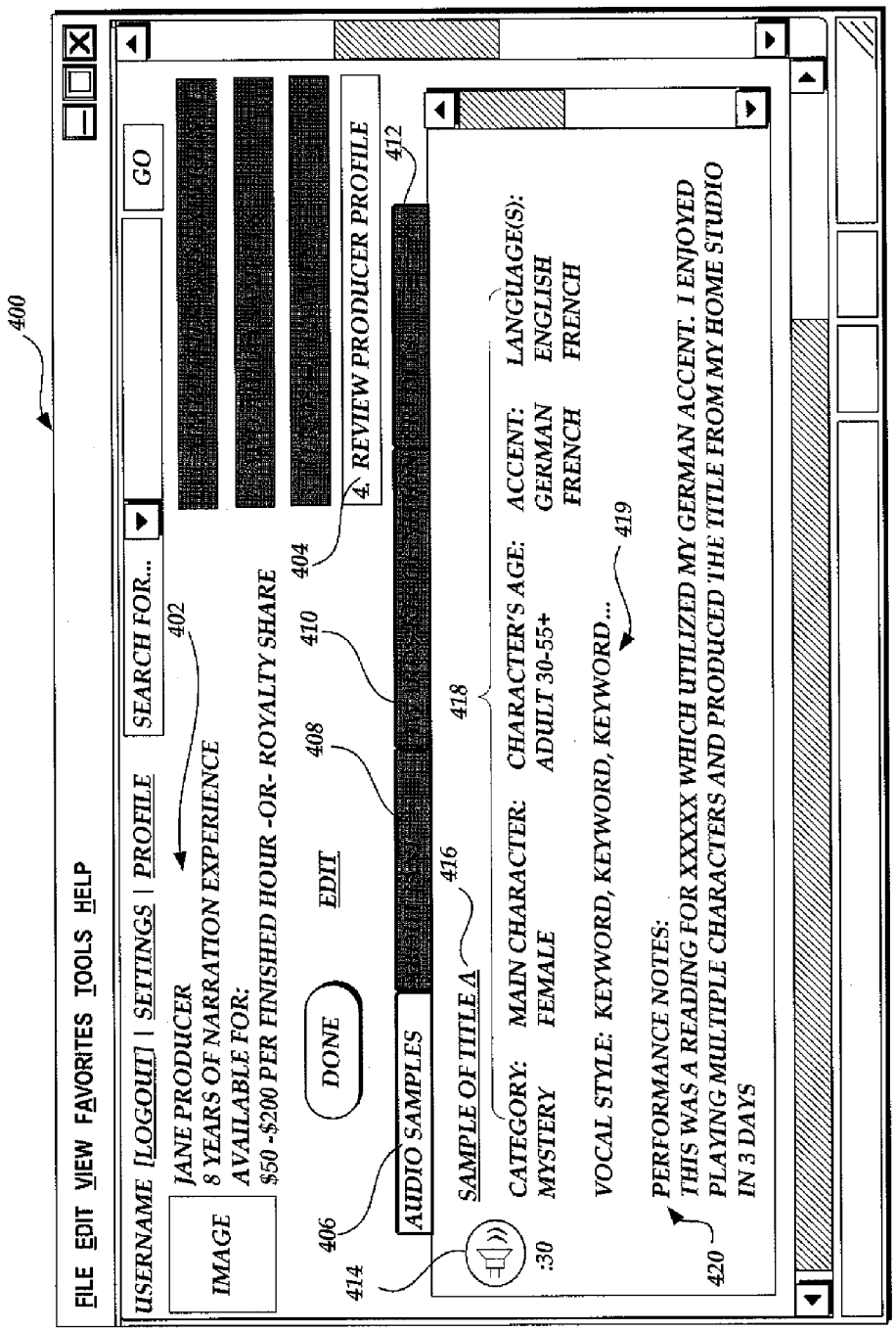
FIG. 4 depicts an illustrative user interface presented to a producer that provides a summary of data input into a producer profile by or on behalf of the producer.

A producer utilizing a producer computing device 110a may construct a producer profile describing the producer and his or her production experience via similar user interfaces that are generated by the content exchange service 104. Although not shown, the content exchange service 104 may generate and present to a producer utilizing computing device 110a, one or more user interfaces that prompt the producer to, inter alia; (1) input data regarding the producer's capabilities and experience in producing audio books; (2) add or upload auditions for producing audio books or other audio samples; and (3) input terms of payment desired by the producer. In addition, the user interface(s) may prompt the producer to input one or more vocal requirements (such as gender, vocal style, character's age, language, accent, etc) and/or audio attributes (such as volume, special effects, etc.) with which the producer prepared the audition. Once the foregoing data is input by the producer and submitted to the content exchange service 104 for storage in the content data store 102, the content exchange service 104 may generate a user interface 400 as illustrated in FIG. 4 that allows the producer to review 404 the producer profile. In the illustrated example, a producer or "narrator" in the audio book context is reviewing her producer profile. Accordingly, the user interface 400 may include a brief description 402 of the narrator's capabilities and experience (e.g., "eight years of narration experience") and terms of payment (e.g., "$50.00-$200.00 per finished hour—or—royalty share") as previously input by the narrator. The audio samples uploaded and submitted to the content exchange service 104 by the narrator may be summarized under an audio samples tab 406 in user interface 400. Such audio samples may include auditions submitted to rights holders for producing audio books.

In the example illustrated FIG. 4, the narrator has added an audio sample 416 of book title A to her producer profile. A viewer of the producer's profile (e.g., the producer in the present context or an interested rights holder in another context) may listen to the audio sample of title A by selecting a play control 414 from the user interface 400. In one embodiment, the sample is 30 seconds long and is reflected as such in the user interface 400. However those skilled in the art will recognize, that the sample may be of any duration or length accepted by the content exchange service 104, specified by the narrator who created the audio sample, or specified by the rights holder of the book for which the sample was produced. In addition to the audio sample, the user interface 400 may also present the vocal requirements 418 under which the narrator produced the audio sample. In the illustrated example, the vocal requirements 419 include the category or genre of the book (e.g., mystery), the gender of the book's main character (e.g., female), the character's age (e.g., adult 30-55+), accent (e.g., German and French), and language(s) (e.g., English and French). However, those skilled in the art will recognize that more, fewer or different vocal requirements 419 may by input by the narrator and stored in the producer profile. In addition, the user interface 400 may include keywords 419 provided by the narrator for identifying the vocal requirement or style in which the narrator produced the audio sample. Such keywords may include adjectives for describing the vocal style, e.g., excited, agitated, depressed, etc. Virtually any adjective describing the vocal style of the narration may be provided by the narrator and then used by the content exchange service 104 to surface the narrator's producer profile in response to search queries by others including the same or similar keywords.

Finally, in the illustrated example, the user interface 400 includes performance notes 420 input by the narrator that describe the narrator's performance or narration in the audio sample and which may assist a rights holder viewing the narrator's producer profile determine whether or not to select the narrator. Although not shown, other data regarding the narrator's capabilities and experience may be presented in the user interface 400 by selecting an about tab 408, an awards/recognition tab 410 or a credits tab 412.

Figure 5:
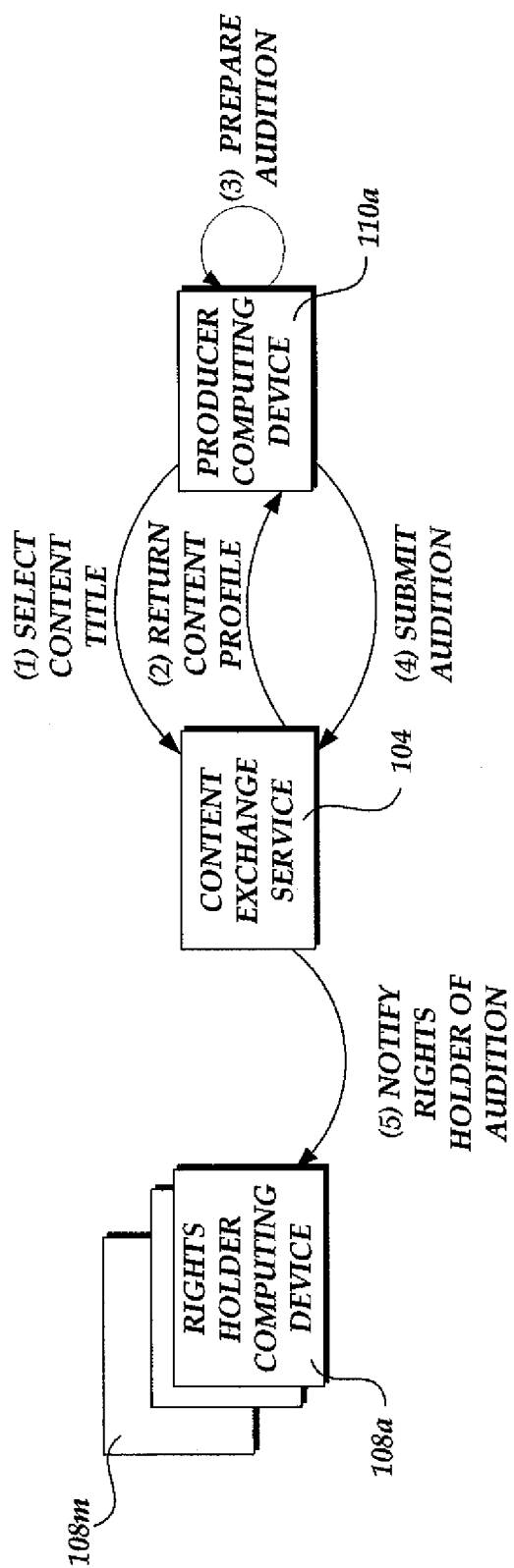
FIG. 5 is a block diagram of the operating environment of FIG. 1, illustrating selection by a producer of a content title for possible production in an alternative form and submission by the producer of an audition for such production.

As noted above, a plurality of rights holders may submit content profiles to the content exchange service 104 and a plurality of producers may submit producer profiles to the content exchange service 104 in order to facilitate communication between, and production of content by, rights holders and producers. In one embodiment, producers can search for content titles in which rights have been asserted by rights holders and for which content profiles have been submitted to the content exchange service 104. As shown in FIG. 5, a producer utilizing a producer computing device 110a may select a content profile from the results of such a search and submit an audition to produce the content title subject of the content profile in an alternative form. As will be appreciated by those skilled in the art, the producer can search for content titles stored in the content data store 102 using any data regarding producers that may be found in a producer profile, e.g., content title, name of producer, capabilities and experience of the producer, terms of payment, vocal requirements, vocal styles, etc. The search may be automated utilizing a search engine implemented by the content exchange service 104 and/or the search may utilize attribute based navigation where a producer interested in locating a content profile may navigate a hierarchy into which the content profiles are organized by attribute. In yet other embodiments, the content exchange service 104 may recommend content profiles to a producer based on the producer's profile, the producer profiles of others and/or the content profiles.

As shown in FIG. 5, once a producer utilizing a producer computing device 110a selects a content profile, the content exchange service 104 may return the content profile for the selected content title to the producer computing device 110a for review by the producer. Based on the data regarding the content title found in the content profile, the producer may prepare an audition to produce the content title in alternative form an upload it to the producer computing device 110a. For example, in the case of a book, the producer or narrator narrates a script for the audition, which script is included in the content profile for the book. The narrator then uploads a digital audio file of the narration to the producer computing device 110a. The digital audio file may be created by the narrator using his or her own recording equipment or the recording equipment of a third party, e.g., a studio. In one embodiment, the digital audio file is an MP3 file. However, in other embodiments, the digital audio file may be created using the producer computing device 110a itself or another computing device having recording capability, such as a smart phone or a personal digital assistant. In yet other embodiments, the producer may call a pre-determined telephone number associated with the content exchange service 104 and/or the operator of the content exchange service 104 and make a voice recording. In this embodiment, the content exchange service is provided the digital audio file of the voice recording.

Once uploaded, the producer computing device 110a submits the audition (more specifically the digital audio file for the audition) to the content exchange service 104, which in turn, may notify the rights holder of the audition. Although not shown in FIG. 5, the content exchange service also stores the submitted audition in the content data store 102 in association with the content profile for the content title. As will be appreciated from the above and FIG. 5, a plurality of producers utilizing computing devices 110 may submit to the content exchange service 104 auditions for a particular content profile. Accordingly, there may be a plurality of auditions for a single content title, especially if the content title is popular. As described in more detail below, the rights holder of the content title may then listen to the auditions utilizing the rights holder's computing device 108a and for those auditions the rights holder likes, contact the respective producers and request more information from the producers and/or make an offer to the respective producers to produce the content in alternative form using the content exchange service 104.

Figure 6:
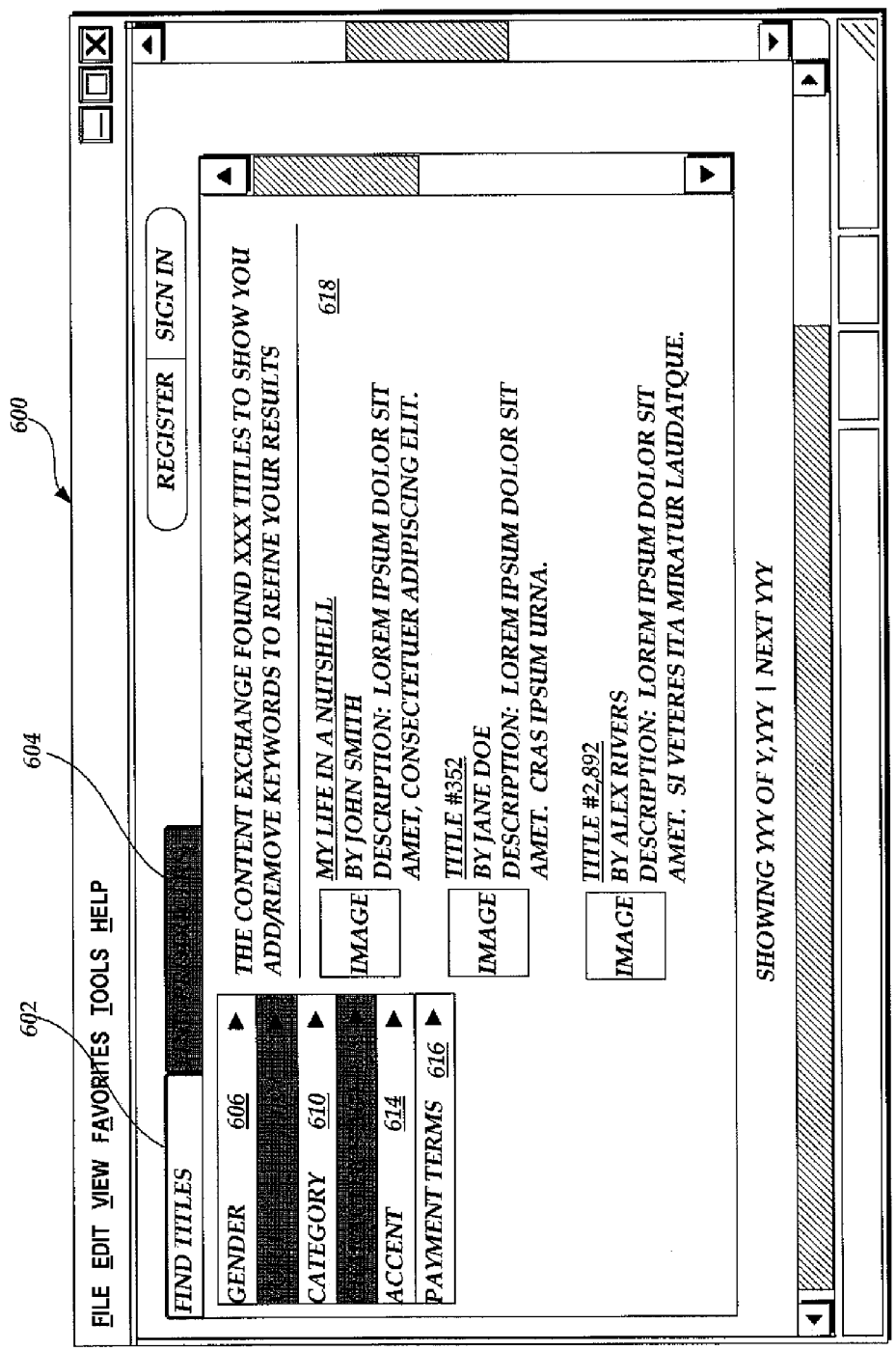
FIG. 6 depicts an illustrative user interface presented to a producer that displays results of a search for content titles available for production in alternative form.

FIG. 6 depicts an illustrative user interface 600 generated by the content exchange service 104 and presented to a producer that displays results of a search for book titles available for production in audio book form. In the illustrated example, a producer searching for book titles under a find titles tab 602 in user interface 600 may input keywords for vocal requirements such as gender 606, point-of-view 608, category 610, character's age 612, accent 614, and/or payment terms 616 by entering such keywords into a text field, by selection from a selectable list or drop down menu, or any other type of input mechanism. In response, the content exchange service 104 may generate a list 618 of book titles that match the keywords entered by the producer. In the illustrated example, three matching book titles are presented. By selecting one of the search results, e.g., "My Life in a Nutshell," the content exchange service 104 may generate a user interface for presenting the content profile for the selected book title to the producer.

Although not shown, the content exchange service 104 may also generate a user interface for presentation to a rights holder that displays results of a search for producers capable and/or available of producing the rights holder's content in an alternative form. In the illustrated example, the rights holder may select a find producers tab 604 from the user interface 600 and conduct a search for producers in a similar to that described above in connection with searching for book titles. Those skilled in the art will recognize that, in such cases, the rights holder may select a producer, and request more information or make an offer to produce the content in an alternative form, without reviewing an audition from the producer and without the producer submitting an audition. In fact, it is not necessary that the producer submit an audition to the content exchange service 104 in order to be selected by the rights holder and for the rights holder to initiate communication with the producer.

Figure 7:
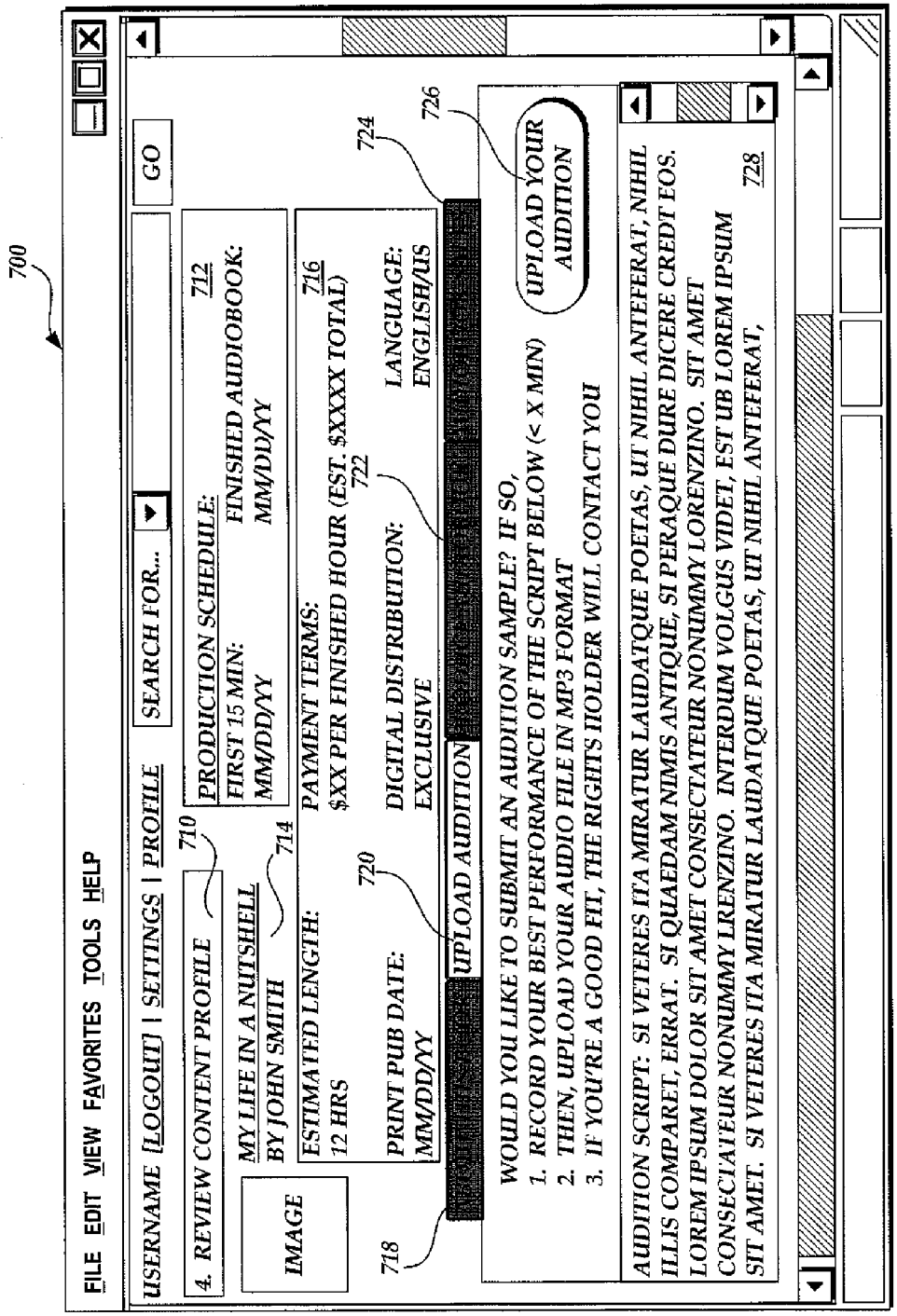
FIG. 7 depict an illustrative user interface presented to a producer that provides a summary of a selected content profile and that enables the producer to submit an audition for the selected content profile.

Returning to FIG. 6, once the producer selects a book title from the search results 618, the content exchange service 104 may generate a user interface 700 as depicted in FIG. 7 that presents the content profile for the book for review by the producer. The user interface 700 may include a title 714 for the book, as well as the production schedule 712 for producing the audio book as specified by the rights holder. In addition, the user interface 700 may include data 716 regarding the payment terms, estimated length, publication date distribution rights and language specified by the rights holder for producing the audio book.

If the producer reviewing 710 the content profile wishes to submit an audition for producing the book in audio book form, the producer may select an upload audition tab 720 from the user interface 700 that instructs the producer regarding preparation and upload of a digital audio file for the audition. In the illustrated example, the upload audition tab 720 also includes the audition script 728 provided by the rights holder of the book. Once the producer records her narration of the script and generates the digital audio file therefor, the producer may select an upload control 726 in order to upload the digital audio file to the producer's computing device 110*a* and submit the audition (or more specifically, the digital audio file of the audition) to the content exchange service 104. Although not shown, selection of the upload control 726 may cause the content exchange service 104 to generate and present to the producer via the producer's computing device 110*a* one or more additional user interfaces that further instruct the producer regarding preparation and uploading of his audition.

Figure 8:
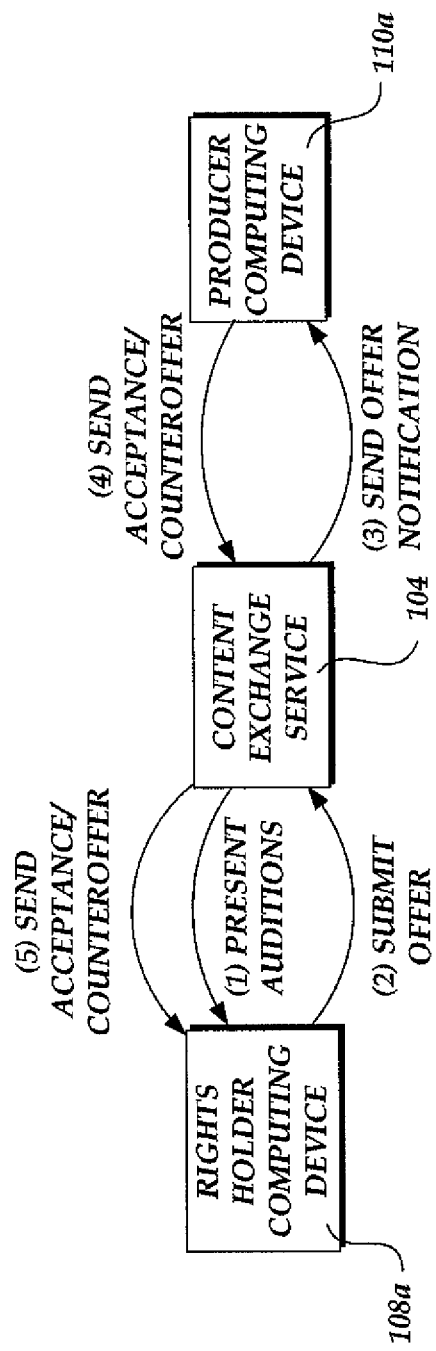
FIG. 8 is a block diagram of the operating environment of FIG. 1, illustrating presentation of an audition to a rights holder and submission of an offer to produce the content title in an alternative form in response to the audition.

As shown in FIG. 8, the content exchange service 104 may present to the rights holder of a content title, one or more auditions for producing the content title in alternative form that have been submitted by one or more producers utilizing producer computing devices 110*a*-110*n*. The one or more auditions may be presented to the rights holder via a user interface generated by the content exchange service 104 and displayed by the rights holder computing device 108*a*. After listening to the submitted auditions for a content title, the rights holder utilizing the rights holder computing device 108*a* may submit an offer to the producer for producing the content in the alternative form. The content exchange service 104 stores the offer made by the rights holder in the content data store 102 (not shown) and sends a notification of the offer to the producer computing device 110*a* utilized by the producer. The producer may accept the offer or make a counteroffer. Accordingly, the producer's computing device 110*a* will send the acceptance or counteroffer to the rights holder computing device 108*a* via the content exchange service 104. In this manner, the rights holder and producer can negotiate an agreement governing the production of the content in alternative form. Accordingly, various offers and counteroffers can be exchanged between the producer and the rights holder until a final offer is accepted and a production agreement is finalized. In one embodiment, the negotiation process is conducted electronically via e-mail, text messages, instant messages, etc. or some other automated process that makes use of user interface displays (e.g., pop-up boxes, windows, chat fields, etc.) to prompt the exchange of offers between the rights holder and the producer. In other embodiments, the negotiations may be conducted in person or via phone. In one embodiment, security measures are implemented by the content exchange service 104 to ensure that all or some personal information, such as contact information, of the rights holder and/or the producer is not disclosed or shared without prior approval by the rights holder and/or the producer. Non-limiting examples of personal information may include phone number(s), email address(es), street address(es), agent information, employer information, etc. In addition, the content exchange service 104 may require that participating rights holders and producers must have an account with the service and login to conduct the negotiations and/or view content profiles and producer profiles. Those skilled in the art will recognize that the offer and acceptance process implemented via the content exchange service 104 (with or without such security) may be an iterative process that continues until either the rights holder or the producer accepts an offer or counteroffer for production. In order to keep negotiations on track, the content exchange service 104 may enable the rights holder and or producer to set expiration dates for offers/counteroffers. Once an offer is accepted and a production agreement finalized, the producer may proceed with production of the content in the alternative form.

Figure 9:
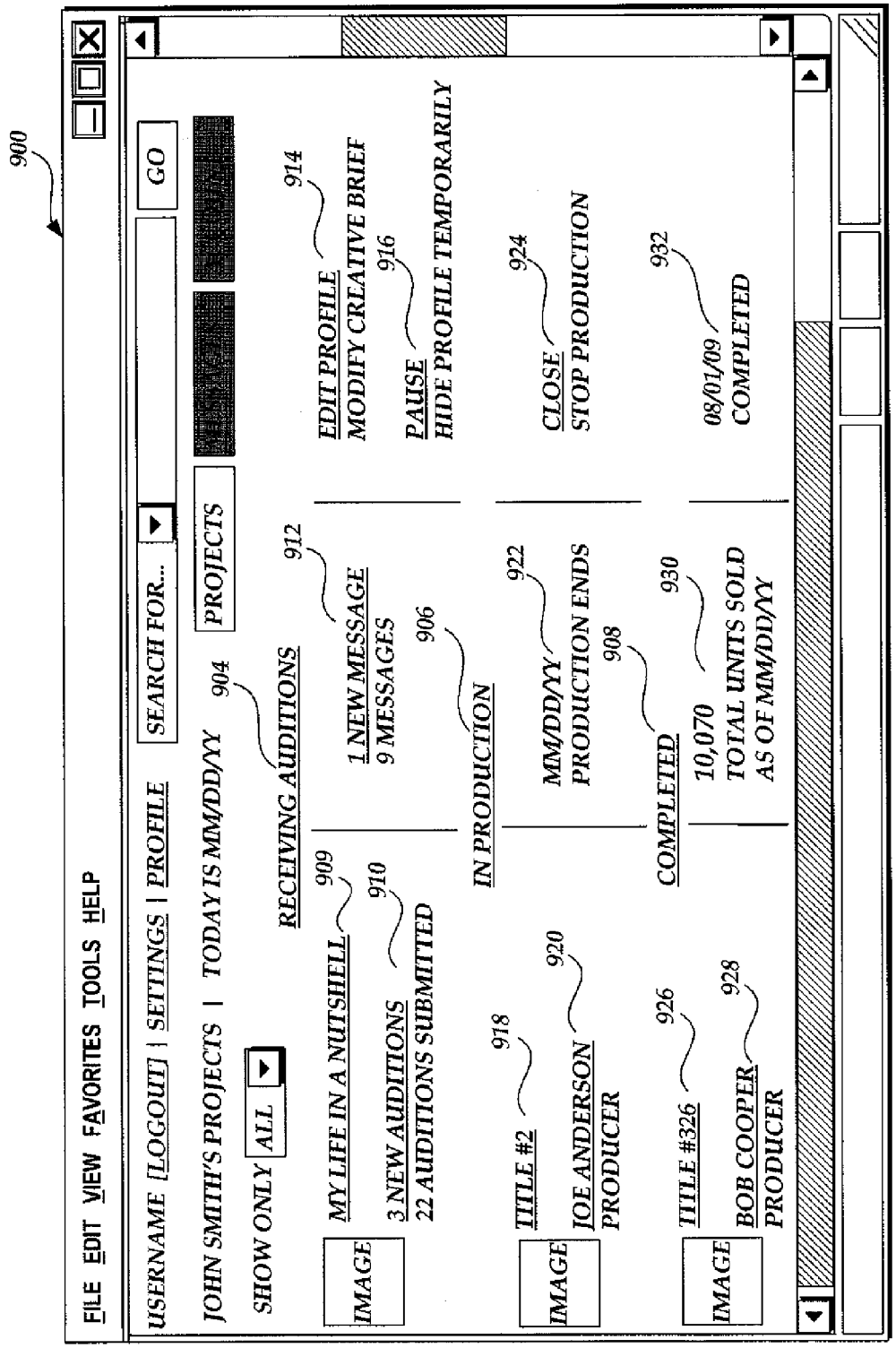
FIG. 9 depicts an illustrative user interface presented to a rights holder that provides a summary of the content titles in which the rights holder controls rights.

FIG. 9 depicts an illustrative user interface 900 presented to a rights holder that provides a summary of the book titles in which the rights holder controls rights and from which the rights holder may access new auditions for producing an audio book. In the illustrated example, the rights holder may be notified of new auditions when he or she logs into the content exchange service 104 and is presented with user interface 900. As shown in FIG. 9, the user interface 900 may summarize the book titles receiving auditions 900, the book titles for which audio books are in production 906 and the book titles for which audio book production is complete 908. For those book titles receiving auditions 904, the title 909 of the book may presented as a hyperlink so that the rights holder may select the link and be presented a user interface, such as user interface 305 depicted in FIG. 3D and described above, for reviewing the content profile for the book title 909. In addition, a link 910 to new auditions for the content title is presented in the user interface 900, as well as an indication of the number of auditions that have been submitted for the book title 909. Upon selection of the auditions link 910, the user may be presented a user interface 1000 as described in more detail below in connection with FIG. 10 for browsing the new auditions. The user interface 900 may also include a link 912 to any new messages received regarding the auditions, along with an indication of the total number of messages received relating to the book title. By selecting the new message link 912, the rights holder is presented with one or more user interfaces (not shown) including the new message(s) submitted to the rights holder. For example, a new message may relate to a new audition submitted by a producer and include additional information the producer believes may be of interest or helpful to the rights holder when reviewing the audition. In the illustrated example, the rights holder may also choose to edit the content profile for the book title 909 by selecting an edit profile link 914 and being presented user interfaces such as user interface 301 and 303 as discussed above to change or modify the creative brief for the book title. Those skilled in the art will appreciate that perhaps after listening to some or all of the auditions submitted for a book title, the rights holder may wish to modify the creative brief for the content title and change one or more of the voice requirements, payment terms, etc. associated with the production.

As also shown in FIG. 9, the rights holder may choose to hide the content profile for the content title temporarily by selecting a pause link 916. This may be desirable if the rights holder does not wish to receive additional auditions for the content title and/or wants to have additional time to review new auditions without receiving more.

As noted above, the user interface 900 may also identify those book titles that are currently in production 906 in audio book form for the rights holder. Accordingly, the rights holder may keep track of the audio books in production and when audio book production for those book titles should end. A title link 918 is similarly provided for each book title of the rights holder currently in production. In addition, a producer link 920 may be included so that when selected by the rights holder, a user interface such as user interface 400 for presenting the producer profile for the producer may be generated by the content exchange service 104 and presented to the rights holder via the rights holder's computing device 108*a*. In addition, a date 922 for when the production is scheduled to end may also be presented in the user interface 900. In the illustrated example, the rights holder may also choose to stop production of the audio book by selecting a close link 924. Selection of the close link 924 may result in presentation of one or more user interfaces (not shown) that enable the rights holder to stop production of the audio book by, for example, instructing the content exchange service 104 not to accept any digital audio files from the producer and/or notify the producer to cease production.

For those audio books that been completed 908, the user interface 900 may also include a title link 926 for the book title for the audio book has been completed and a producer link 928 for identifying the producer of the completed audio book. In addition, data regarding a total number of units sold 930 as of a particular date may be included in the user interface 900, as well as the date 932 upon which production of the audio book was completed.

Those skilled in the art will appreciate that different, additional or fewer options may be presented to the rights holder in connection with auditions being received for a book title, audio books that are in production and audio books that have been completed. In addition, although only one book title is depicted in FIG. 9 as receiving auditions, as in production and as completed, those skilled in the art will appreciate, that additional book titles in which the rights holder has asserted rights may be displayed.

Figure 10:
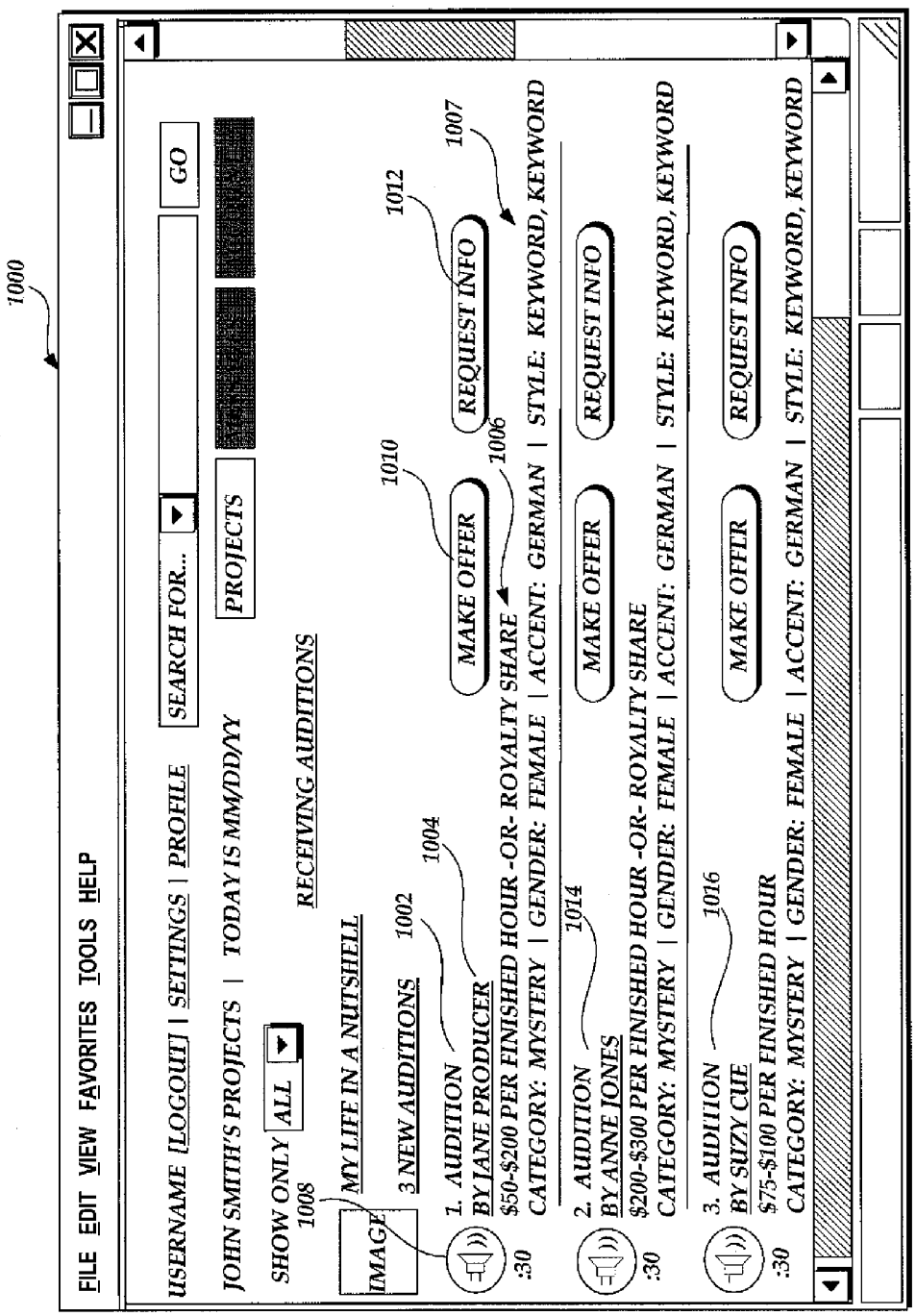
FIG. 10 depict an illustrative user interface presented to a rights holder that provides a summary of the auditions received for producing a content title in an alternative form.

If the rights holder selects the new auditions link 910 in user interface 900, the content exchange service 104 may generate a user interface 1000 such as that shown in FIG. 10 in order to present the received new auditions to the rights holder for review. In the illustrated example, three new auditions 1002, 1014 and 1026 for the book "My Life in a Nutshell" have been received. The first audition 1002 was submitted by Jane Producer 1004. The rights holder may listen to the first audition 1002 by selecting a play control 1008. The payment terms 1006 specified by the producer in his or her producer profile may also be presented in connection with the producer's audition, as well as the vocal requirements 1007 under which the producer generated the audition. In the illustrated example, similar information and controls are presented for each other auditions 1014 and 1016 received for books in which the rights holder has asserted rights. In some embodiments, the user interface 1000 may include a forwarding option, that when selected by the rights holder, causes the content exchange service 104 to forward one or more of the auditions 1002, 1014 and 1016 to another person for review. The other person may then provide feedback to the rights holder regarding the audition which may further assist the rights holder in selecting a producer.

Upon listening to one or more of the auditions received, the rights holder may either request additional information from the corresponding producer by selecting a request info control 1012 or the rights producer can make an offer to the producer for full production of the audio book by selecting a make offer control 1010. In either case, the content exchange service 104 may generate and present to the rights holder via the rights holder's computing device 108*a* one or more user interfaces (not shown) for inputting the additional information the rights holder is requesting or inputting the terms of the offer the rights holder wishes to make to the producer, whichever the case may be. In either case, the content exchange service 104 may notify the producer of the request for information or the offer being made by the rights holder an electronic mail message, a short message service message ("SMS"), a facsimile message, etc. In yet other embodiments, the notification is provided to the producer via a user interface presented to the producer that summarizes messages and/or offer notifications received. In yet other embodiments, the rights holder may contact the producer using more manual methods, e.g., by phone, post, etc.

Figure 11A:
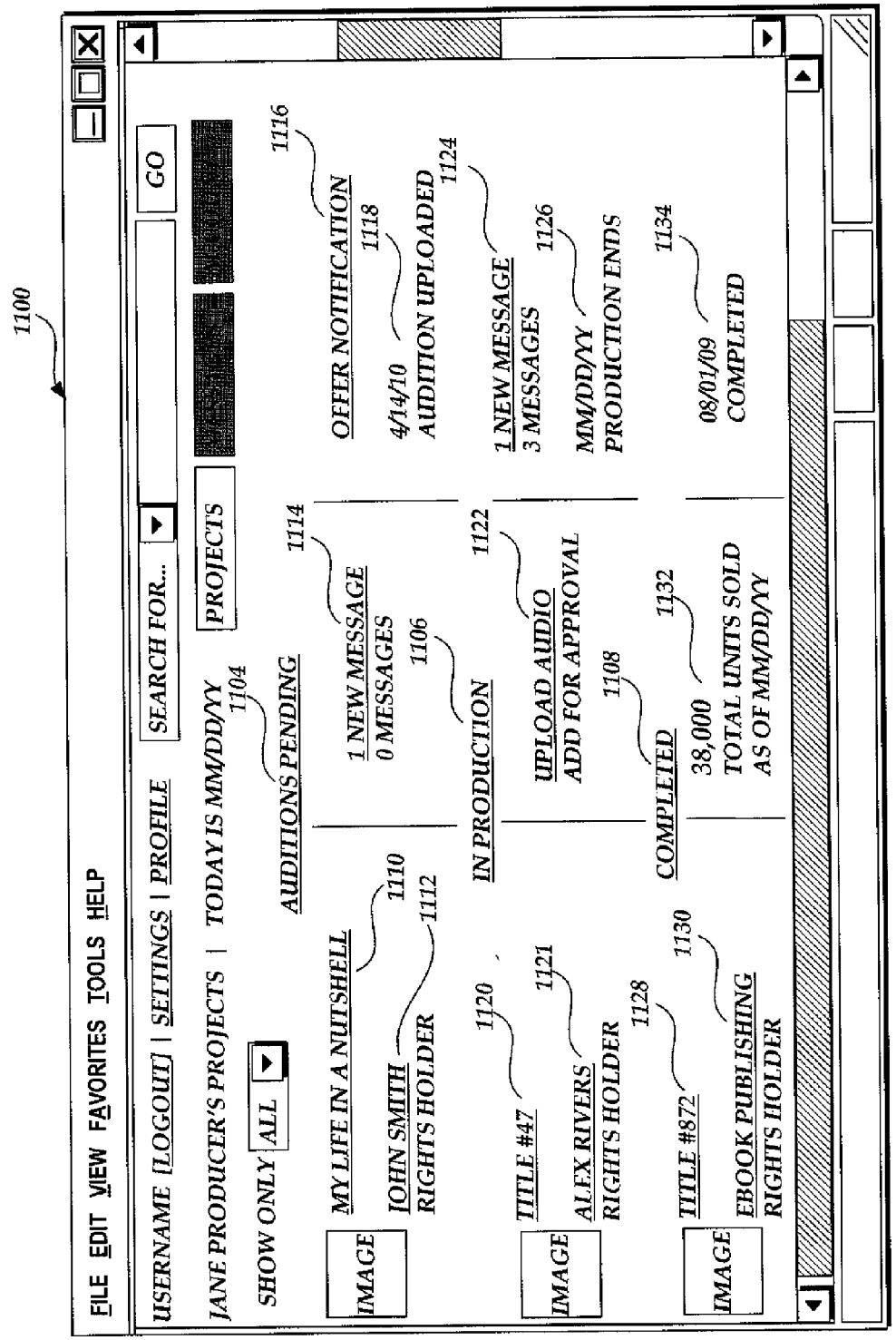
FIGS. 11A and 11B depict illustrative user interfaces presented to a producer that provide a summary of the content titles for which the producer has submitted auditions for producing the content titles in an alternative form.
Figure 11B:
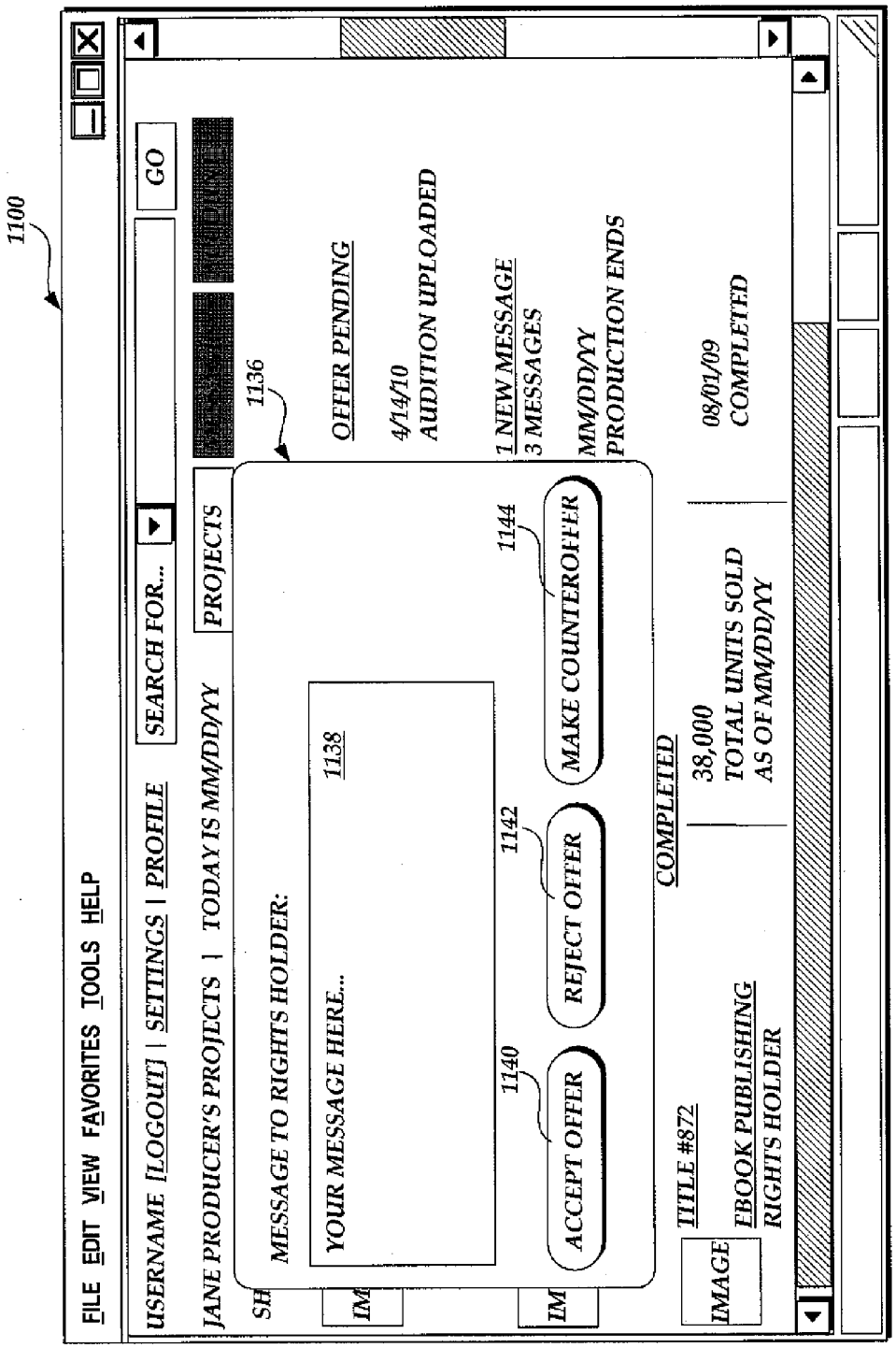

FIGS. 11A and 11B depict an illustrative user interface 1100 generated by the content exchange service 104 and presented to a producer utilizing a computing device 110*a* that provide a summary of the book titles for which the producer has submitted auditions for producing audio books. In the illustrated example, the user interface 1100 summarizes the producer's pending auditions 1104, the audio books currently in production by the producer 1106 and the audio books completed by the producer 1108. With respect to the pending auditions 1104, each book title for which the producer has submitted an audition may be presented in the user interface 1100. In the illustrated example, the producer has submitted an audition for the book "My Life in a Nutshell" whose title appears as a link 1110 under auditions pending 1104. If the producer selects the link 1110 for the book title, the user interface 305 described above for presenting the content profile for the content title may be presented to the producer. Similarly, if the producer selects a rights holder link 1112 included in the user interface 1100 the producer may be presented additional information regarding the rights holder for the book title that is included in the content data store 102 and/or content profile. Similar to use interface 1000, the user interface 1100 may include a link 1114 to any new messages regarding the audition for producing an audio book for the book title. Such messages may have been initiated by the rights holder in the book title, may include requests for additional information from the producer and/or or may communicate information otherwise relevant to the pending audition.

If the rights holder for a book title has made an offer to the producer to produce an audio book for the book title, the user interface 1100 may include an offer notification link 1116 that when selected, results in one or more user interfaces or other messaging mechanisms to be presented to the producer. As described above, the offer notification may include the rights holder's initial offer for production of the audio book, including but not limited to, one or more voice requirements for the audio book, payment terms for the audio book, etc. As also described above, the producer may respond to the offer notification from the rights holder by accepting the offer or submitting a counteroffer. In the latter case, the counteroffer may be forwarded to the rights holder by the content exchange service 104 for possible acceptance by the rights holder or further negotiation. Those skilled in the art will recognize that additional offers and counter offers can be made iteratively until either the rights holder or the producer accepts an offer and the production agreement is finalized. At such time, the book title shall be considered "in production" and will appear in the user interface 1100 in the "in production" portion 1106 of the user interface. The date 1118 that the audition for the book was uploaded may also be presented in the user interface 1100.

For those book titles in production 1106, a title link 1120 and rights holder link 1121 may also be included in the user interface 1100. In addition, an upload audio link 1122 may be presented for initiating upload of a digital audio file to the producer computing device 110*a* and submission of the digital audio file to the content exchange service 104. A sample user interface for instructing the producer to upload the digital audio file will be discussed below in connection with FIG. 13. The producer may access any new messages related to the content title in production by selecting a new message link 1124 and may be reminded of the deadline by which production is scheduled to end by the date 1126 presented in user interface 1100.

For those audio books that are completed 1108, the user interface 1100 may also include a title link 1128 and a rights holder link 1130. In addition, user interface 1100 may present the total number of units sold 1132 of the completed audio book as of a particular date. Finally, the user interface 1100 may include the date 1134 upon which production of audio book was completed.

Returning to offer notification, if the producer selects the offer notification link 1116 from the user interface 1100, a pop-up box or other user interface mechanism for reviewing, accepting, rejecting or submitting a counteroffer may be presented to the producer. In the example illustrated in FIG. 11B, a pop-up box 1136 is provided that includes a message field 1138 for the producer to input a message to the rights holder regarding the offer. In addition, the pop-up box 1136 includes an accept offer control 1140 which may be selected by the producer. Alternatively, the producer may opt to reject the offer and therefore select the reject offer control 1142. As yet another option, the producer may elect to submit a counteroffer to the rights holder and therefore select a make counteroffer control 1144. As a result, the message input by the producer is submitted to the content exchange service 104 and passed on to the rights holder via the computing device 108 utilized by the rights holder. If the accept offer control 1140 is selected, a production agreement is established between the rights holder and producer according to the vocal requirements and payment terms last presented. Accordingly, the producer will proceed with production of the audio book. If the offer is rejected, the rights holder may opt to make a new offer to the producer via the content exchange service 104 as previously described or simply move on to consideration of an audition from another producer. If the producer elects to make a counteroffer, the rights holder may accept the offer, reject the offer or make another counteroffer utilizing similar user interface input controls and mechanisms as described above. In this manner, negotiation of the production agreement for producing the book title in audio book form may be carried out and ultimately terminate upon acceptance of an offer by one of the parties or rejection of the offer by one of the parties.

Figure 12:
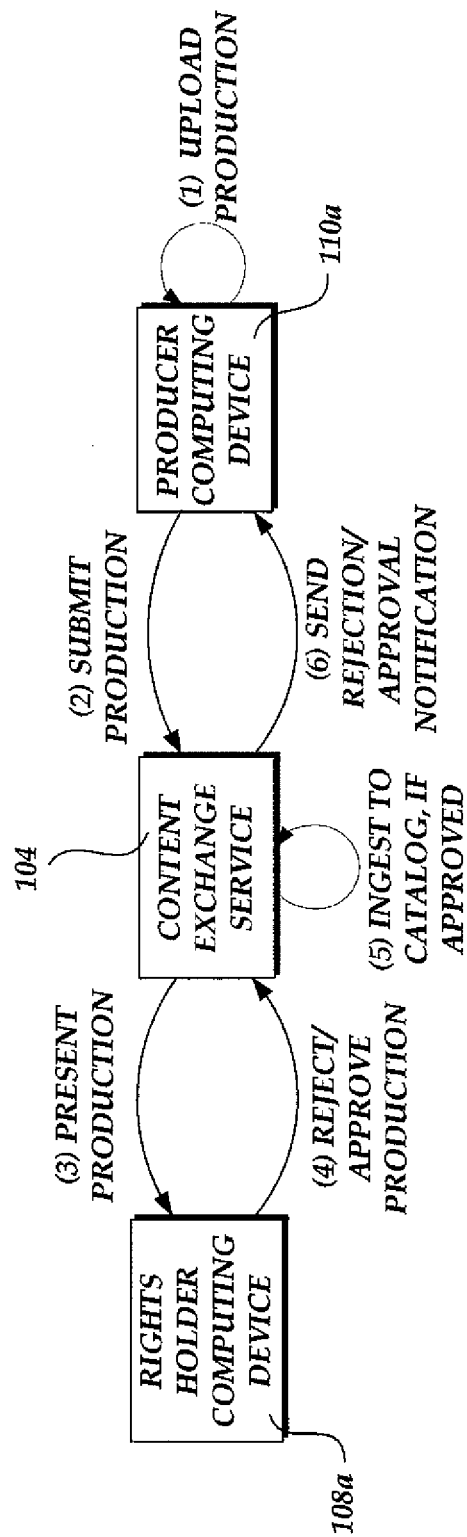
FIG. 12 is a block diagram of the operating environment of FIG. 1, illustrating production of content in an alternative form by a producer and approval of such production by a rights holder.

As shown in FIG. 12, once a production agreement has been finalized between a rights holder and a producer, the producer may iteratively construct or build the production of the content in alternative form. As described in more detail below in connection with FIG. 13, the producer may do so in one embodiment upon receipt of a manuscript for a book and subsequent upload of all or portions of the audio book prepared from the manuscript. For example, the producer may construct the audio book iteratively based on a structure for the book, e.g., introduction, credits, chapters, appendix, etc. and thus, narrate and upload as separate digital audio files each such portion.

Returning to FIG. 12, upon upload of each portion of the production to the producer's computing device 110*a*, the producer computing device 110*a* submits the uploaded portion of production to the content exchange service 104. The content exchange service may then present each portion of production in the alternative form to the rights holder for review via the rights holder computing device 108*a*. For example and as will be discussed in more detail below in connection with FIG. 14, the rights holder may review each portion of the audio book uploaded and submitted to the content exchange service 104, and reject or approve of the portion.

Production of the content in alternative form may be conducted in one or more stages. For example, an initial production of the content in alternative form may be uploaded by the producer for preliminary review by the rights holder in order for the rights holder to confirm that the production is proceeding in accordance with the rights holder's requirements and the production agreement between the rights holder and the producer. As discussed above, the producer may record only, for example, the first 15 minutes of the content in alternative form and submit the first 15 minutes to the producer for initial approval. If approved, the producer may proceed with the remainder of the production and submit the remaining portion(s) of the production as a single digital audio file or multiple digital audio files. If not approved, the rights holder may set a time period in which the producer must submit an acceptable first 15 minutes. If the producer is unable to comply, the production agreement may be automatically canceled by the content exchange service 104 or canceled at the option of the rights holder. Once the subsequent digital audio files are reviewed and approved by the rights holder, the completed or full production may be ingested by the content exchange service 104 into an electronic catalog for subsequent sale or access. In some embodiments, the electronic catalog includes items that are available for access or purchase via a retail or library Website. The retail or library Website may be operated by the same operator as the content exchange service 104 or a third party.

If the complete production of the content in alternative form, or a portion thereof that was uploaded by the producer and presented to the rights holder, is rejected, the content exchange service 104 will send notification of the rejection to the producer via the producer computing device 110*a*. Typically, the notification will include a message from the rights holder describing the reasons why the production was rejected and providing instructions for revision. Accordingly, the producer may revise the production of content in the alternative form in accordance with the rights holder's instructions and resubmit the production via the same or similar process. This process may be repeated until the rights holder approves the full or complete production of the content in alternative form and the content exchange service 104 sends an approval notification to the producer.

Figure 13:
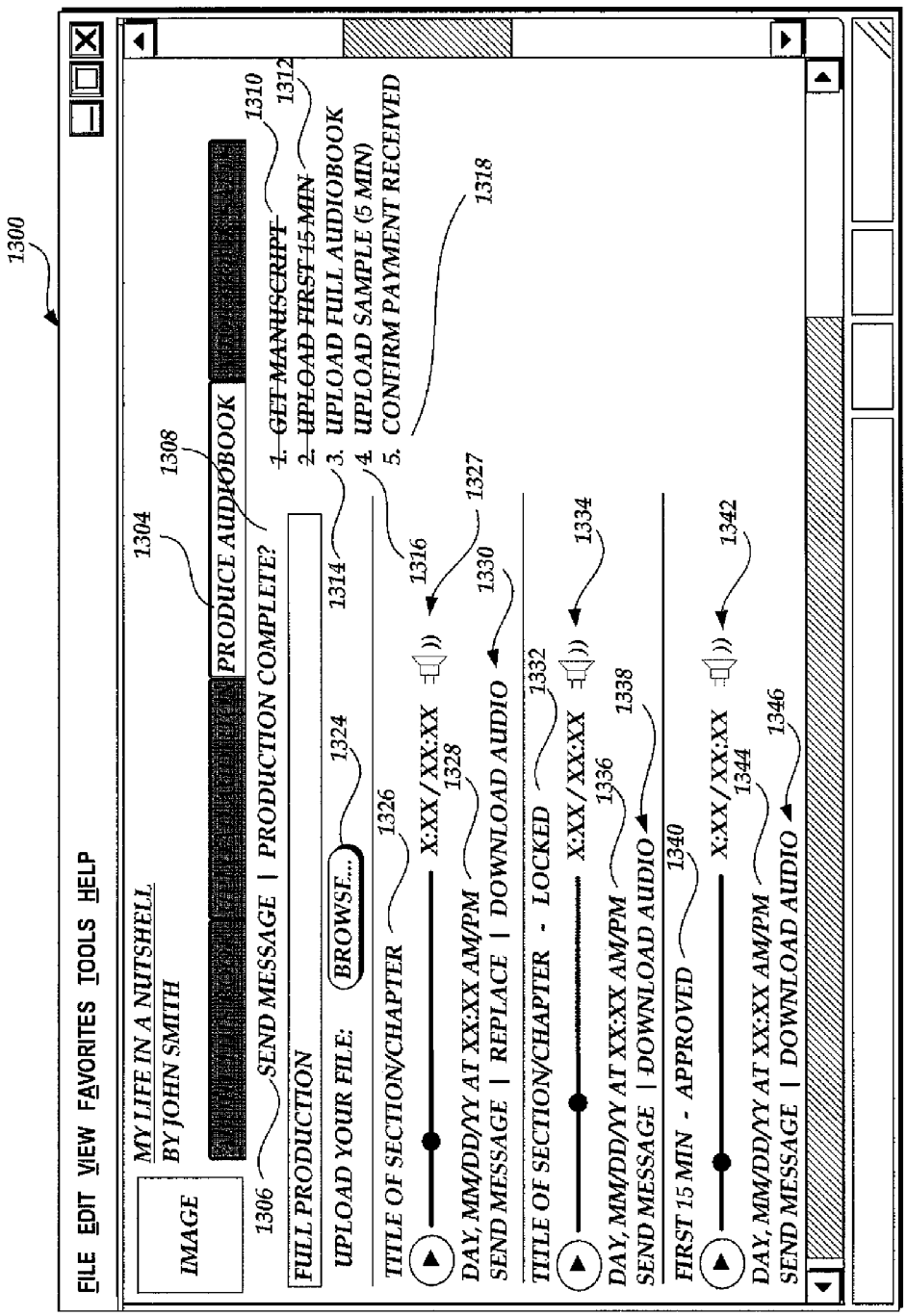
FIG. 13 depicts an illustrative user interface presented to a producer that enables the producer to submit production of the content title in an alternative form.

An illustrative user interface 1300 that is generated by the content exchange service 104 and presented to the producer for uploading the digital audio files for a book title is depicted in FIG. 13. The user interface 1300 is presented to the producer upon selection of a produce audio book tab 1304. In the illustrated example, the user interface 1300 includes data from the content profile for the book title. The user interface 1300 depicted in FIG. 13 is generated after the producer has obtained a manuscript 1310 from the rights holder and uploaded a first 15 minutes 1312 of the audio book and the first 15 minutes of the audio book has been approved. Accordingly, the user interface 1300 prompts the producer to upload a next portion of the audio book. In addition, the user interface 1300 identifies the prior portions of the audio book uploaded by the producer and the status of each such portion. For example, the producer has previously submitted and had approved the first 15 minutes 1340 of the audio book. Accordingly, the user interface 1300 reflects a progress line 1342 that indicates the length of the digital audio file for the first 15 minutes of the audio book that has been uploaded and approved. In addition, the date and time 1344 at which the first 15 minutes was uploaded is reflected. By selecting a send message or download audio option 1346, the rights holder may elect to send a message regarding the first 15 minutes of the audio book to the rights holder or may select to download the digital audio file for the first 15 minutes for further review.

User interface 1300 also reflects that a first section or chapter of the book has been uploaded, submitted and locked for production 1332. A progress line 1334 may also be presented to indicate the length of the first portion of audio book, along with a date and time 1336 at which the first portion was uploaded. By selecting a send message or download audio option 1338, the rights holder may elect to send a message regarding the first portion of the audio book to the rights holder or may select to download the digital audio file for the first portion for further review.

In the illustrated example, the producer has also uploaded and submitted a second portion 1326 of the audio book for review. However the second portion has not yet been approved and thus, locked. A progress line 1327, upload date and time 1328 and send message, replace and download audio options 1330 are also presented. The user interface 1300 further prompts the producer to upload a digital audio file for the next portion of the production. By selecting a browse control 1324, the producer may be presented one or more user interfaces (not shown) that guide the producer through the upload process. Once uploaded and submitted to the content exchange service 104, those skilled in the art will appreciate that the user interface 1300 may be updated to reflect the submission of the next portion in accordance with the above.

Once the producer has uploaded a final portion of the audio book (or perhaps the full audio book), the producer may select a production complete option 1308 from the user interface 1300 in order to notify the content exchange service 104 that a full production of the audio book has been submitted. Moreover, the producer may select a send message option 1306 in order to generate a message to the rights holder in connection with the production. Although not shown, following receipt of an indication from the producer that production of the audio book, the producer may be prompted to upload a post production sample of the book produced in audio book form (e.g., a five minute sample) that can be used for marketing purposes. For example, the post production sample may be ingested into the electronic catalog along with the full production and presented to consumers interested in accessing or purchasing the full production. In addition, the content exchange service 104 may generate one or more user interfaces (not shown) for presentation to the producer that confirm payment has been received by the producer in accordance with the production agreement between the producer and the rights holder.

Figure 14:
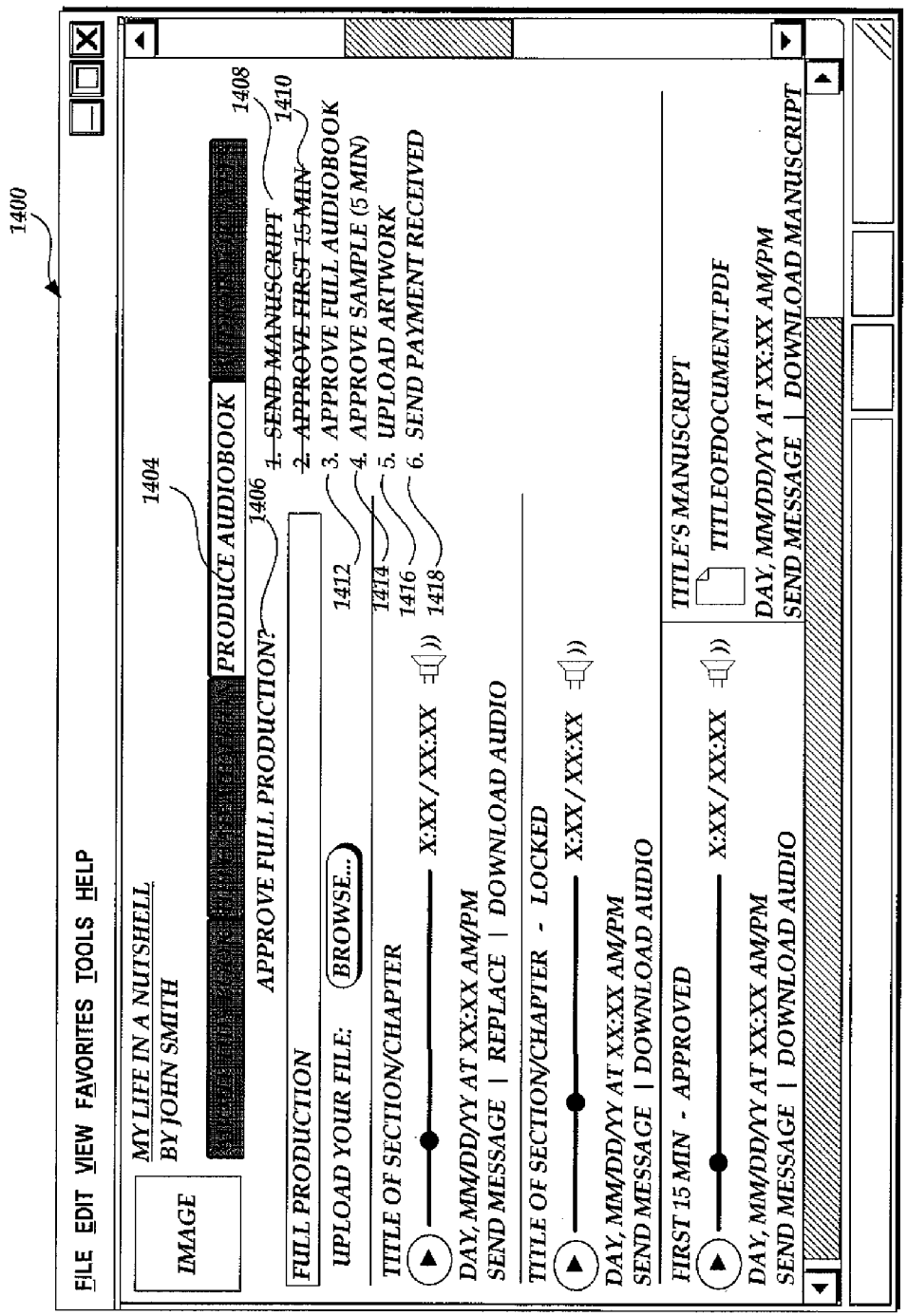
FIG. 14 depicts an illustrative user interface presented to a rights holder for enabling the rights holder to approve of the production of the content title in an alternative form that is submitted by a producer.

FIG. 14 depicts an illustrative user interface 1400 similar to that shown in FIG. 13 for tracking the production of an audio book by a producer. However, the user interface 1400 is presented to the rights holder of the corresponding book title upon selection of a produce audio book tab 1404. As reflected in FIG. 14, the rights holder has already sent a manuscript 1408 to the producer for narrating the audio book and has already approved 1410 the first 15 minutes of the audio book that was submitted by the producer. Accordingly, via the user interface 1400, the rights holder may listen to each portion of the audio book that has been prepared and submitted by the producer. Accordingly, the rights holder may download the digital audio file for each portion submitted and approve each portion one by one. In the illustrated embodiment, the rights holder may indicate that he or she approves 1412 of the completed audio book by selecting an approved full production control 1406. As discussed above, upon approval of the completed audio book by the rights holder, the audio book may be ingested in an electronic catalog and notification of the approval may be sent by the content exchange service 104 to the producer. However, in some embodiments, prior to ingesting the completed audio book into the electronic catalog, one or more user interfaces may be generated by the content exchange service 104 and presented to the rights holder for approving a sample of the audio book 1414, for an enabling the rights holder to upload artwork related to the audio book 1416, and to send payment to the producer for the production of the audio book 1418 as specified by the production agreement between the parties.

Figure 15:
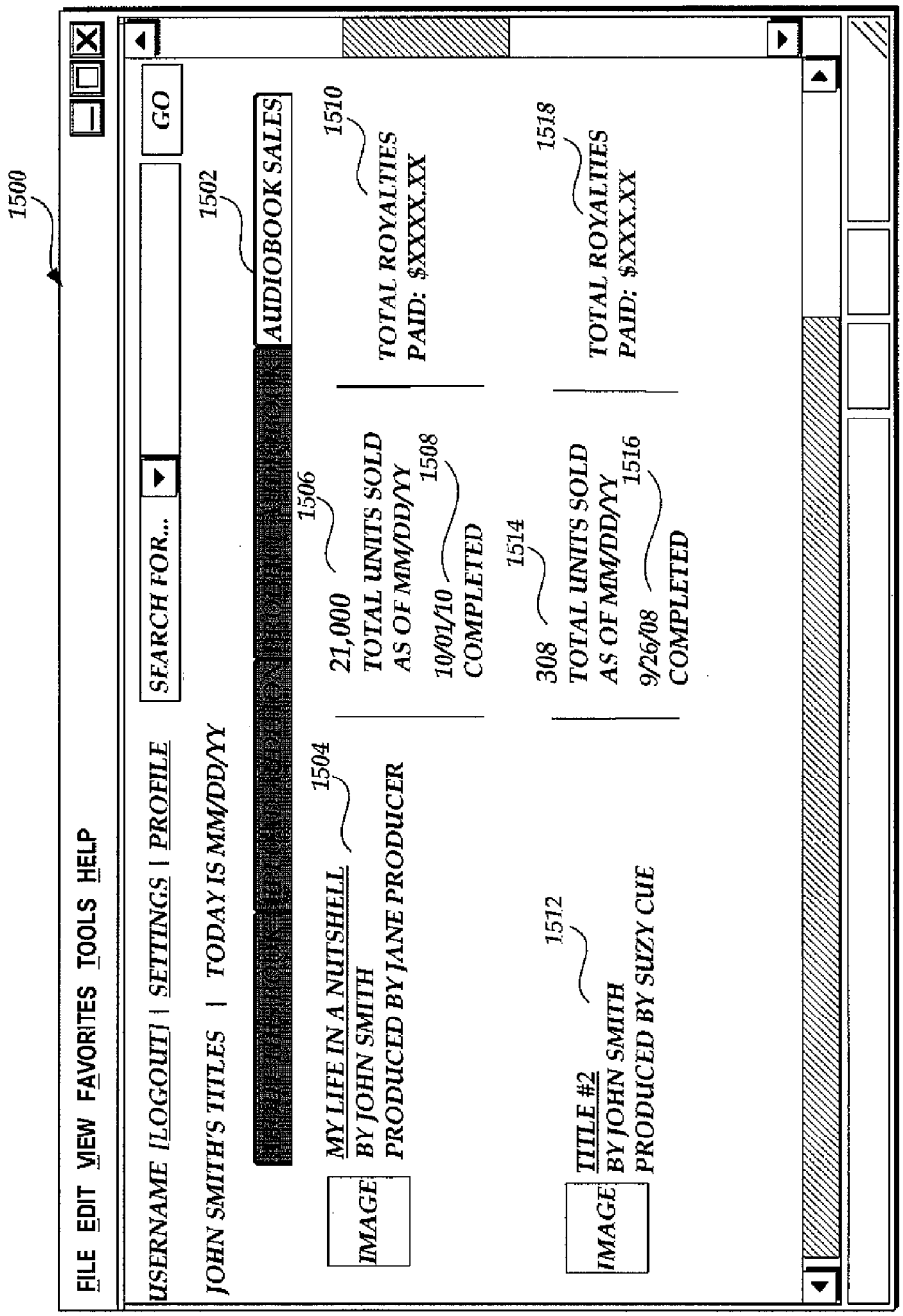
FIG. 15 depicts an illustrative user interface presented to a rights holder or a producer that summarizes sales of content titles produced in an alternative form.

User interface 1400 is similar to the user interface 305 described above for presenting a content profile for a particular book to the rights holder. Accordingly, the rights holder may log into the content exchange service 104 at any time and view the content profile for any of the content titles in which the rights holder has asserted rights. In such instances, the rights holder may select the audio book sales tab of the user interface as shown in FIG. 15. FIG. 15 depicts a user interface 1500 for reporting various data regarding the sale of audio books produced as described above. In the illustrated example, the user interface 1500 includes the titles 1504 and 1512 of the audio books that have since been made available for sale, the total number of units 1506 and 1514 sold as of a particular date. and the completion date 1508 and 1516 for each production. In addition, the user interface 1500 may include the total royalties paid or owed 1510 and 1518 by the rights holder to the producers of the productions identified. Those skilled in the art will appreciate that the summary report depicted in FIG. 15 is merely illustrative and that the content exchange service 104 may generate and present to rights holders and the producers a variety of summary reports. Non-limiting example of summary reports include sales history reports (e.g., total sales for a given time period, geographic scales, market basket scales, etc.) access history reports, conversion history reports, etc. Market basket sales reports may reflect what other items may have been purchased together with a particular audio book. Those skilled in the art will recognize that the summary reports may be populated with data stored in the content data store 102.

In yet other embodiments, the rights holder or producer can further narrow summary reports by selecting various narrowing criteria. Such narrowing criteria may include, but not be limited to, author, artist, category, reporting period, geography, language, etc. The narrowing criteria may be entered by direct input into a text field, by selection from a selectable list or drop down menu, or any other type of input mechanism known in the art. Moreover, the narrowing criteria may include fewer, more or different criteria than mentioned above and may further be dependent on the type of content for which production in an alternative form was performed, e.g., books, music, film, etc. The narrowing criteria may be any type of criteria deemed suitable for organizing extracted relevant data from the content data store 102, e.g., sales performance, length of digital audio file, etc. Accordingly, a producer or rights holder can further narrow a summary report by selecting various narrowing criteria.

Those skilled in the art will recognize that the content exchange service 104 may generate a variety of user interfaces other than those depicted in FIGS. 3A-3D, 4, 6, 7, 9, 10, 11A-11B and 13-16 with departing from the scope of the present disclosure. For example, various user interfaces may be generated to enable producers to submit bids in an auction for the opportunity to produce the rights holder's content in an alternative form. Such a user interface may prompt a producer to enter a cost for producing the content in the alternate form, as well as to upload an audition for producing the content.

Once a producer has submitted an audition for producing a rights holder's content in an alternative form, the content exchange service 104 may generate one or more user interfaces to present to the rights holder the submitted bids (including auditions) and producer profiles for review and ultimate selection. The rights holder can then establish communication with the producer who submitted the winning bid via user interface such as those described above. As noted above, the winning bid may be the bid with the lowest cost for producing the work in alternative form. However, in other embodiments, the rights holder or the content exchange service 104 may decide the winning based on other or additional criteria, e.g., narrator experience, voice attributes, producer's production history, etc. In yet other embodiments, only those producers who meet the rights holder's requirements for production may be allowed to submit bids. In such embodiments, the producer with the lowest bid may be selected.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
storing, by one or more computing devices, in an electronic data store, data regarding a plurality of content titles, wherein the data regarding each content title stored in the electronic data store is submitted by or on behalf of a holder of rights in the content title and includes one or more requirements for producing the content title in an alternative digital form;
receiving, by the one or more computing devices, a search request submitted by at least one potential producer, wherein the search request indicates vocal capabilities of the at least one potential producer;
in response to the search request, determining by the one or more computing devices, based at least in part on the content title data stored in the electronic data store, a plurality of content titles for which the vocal capabilities indicated in the search request meet the stored one or more requirements for producing each of the plurality of content titles in an alternative digital form;
presenting, by the one or more computing devices, data regarding the plurality of content titles for review to the at least one potential producer, wherein the data regarding each of the plurality of content titles that is presented comprises the one or more requirements for producing the content title into an alternative digital form;
electronically receiving from the at least one potential producer a digital sample production of a content title in the alternative digital form, wherein the digital sample production was produced by the at least one potential producer based at least in part on the one or more requirements for producing the content title into the alternative digital form that are presented for review, wherein the digital sample production comprises narration audio data corresponding to a portion of text content of the content title;
presenting, by the one or more computing devices, the digital sample production of the content title in the alternative digital form to the rights holder of the content title;
facilitating electronic communication regarding production of the content title in the alternative digital form between the at least one potential producer and the rights holder of the content title;
presenting, by the one or more computing devices, a full production of the content title in the alternative digital form to the rights holder of the content title, wherein the full production was produced by the at least one potential producer; and upon acceptance by the rights holder of the full production of the content title in the alternative digital form, submitting to an electronic catalog the full production of the content title in the alternative digital form.

2. The computer-implemented method of claim 1, wherein facilitating communication between the at least one potential producer and the rights holder comprises:

electronically communicating an offer to produce the content title in the alternative digital form; and electronically communicating an acceptance to produce the content title in the alternative digital form.

3. The computer-implemented method of claim 1 further comprising:

storing, in the electronic data store, data regarding a plurality of potential producers for producing content titles, wherein the data regarding each potential producer stored in the electronic data store is submitted by or on behalf of the potential producer.

4. The computer-implemented method of claim 1, wherein the content title is a book title and the alternative digital form is an audio book.

5. The computer-implemented method of claim 4, wherein the at least one potential producer is a narrator.

6. A system for enabling communication between a producer of content and a holder of rights in content, the system comprising:

an electronic data store that stores data regarding a plurality of contents, wherein the data regarding each content is stored in the electronic data store on behalf of a holder of rights in the content and includes one or more requirements for producing the content in an alternative digital form; and a computing device in communication with the electronic data store that is operative to:

receive a search request submitted by a producer, wherein the search request indicates vocal capabilities of the producer;

in response to the search request, determine, based at least in part on the content data stored in the electronic data store, a plurality of contents for which the vocal capabilities indicated in the search request meet the stored one or more requirements for producing each of the plurality of contents in an alternative digital form;

present data regarding at least one content of the plurality of contents for review to the producer, wherein the data regarding the at least one content that is presented to the producer comprises the one or more requirements for producing the content in an alternative digital form;

exchange electronic offer and acceptance of an agreement between the producer and the rights holder of the at least one content to produce the at least one content in the alternative digital form according to said one or more requirements;

facilitate production of the at least one content in the alternative digital form, wherein the alternative digital form comprises narration audio data corresponding to the at least one content, wherein the production is produced by the producer in accordance with the agreement between the producer and the rights holder of the at least one content.

7. The system of claim 6, wherein facilitating production of the at least one content in alternative digital form comprises:

electronically receiving from the producer a sample production of the at least one content in the alternative digital form, wherein the sample production was produced by the producer according to said one or more requirements for producing the at least one content in the alternative digital form; and presenting the sample production of the at least one content in the alternative digital form to the rights holder of the content.

8. The system of claim 6, wherein facilitating production of the at least one content in alternative digital form comprises:

receiving from the producer a first portion of the production of the at least one content in the alternative digital form, wherein the first portion of the production was produced by the producer according to said one or more requirements for producing the at least one content in the alternative digital form; and presenting the first portion of the production of the at least one content in the alternative digital form to the rights holder of the at least one content for review.

9. The system of claim 6, wherein facilitating production of the at least one content in alternative digital form further comprises:

receiving from the producer a complete production of the at least one content in alternative digital form, wherein the complete production of the at least one content was produced by the producer according to said one or more requirements for producing the at least one content in alternative digital form; and presenting the complete production of the at least one content in the alternative digital form to the rights holder of the at least one content for review.

10. The system of claim 6, wherein the computing device is further operative to:

upon approval by the rights holder of the production of the at least one content in the alternative digital form, submitting to an electronic catalog the production of the at least one content in the alternative digital form.

11. The system of claim 6, wherein the electronic data store stores data regarding a plurality of producers, wherein the data regarding each producer stored in the electronic data store is submitted by or on behalf of the producer.

12. The system of claim 11, wherein the computing device is further operative to:

present data regarding at least one potential producer for review to the rights holder of the at least one content, wherein the data regarding the at least one potential producer that is presented to the rights holder comprises one or more qualifications of the producer for producing content in an alternative digital form.

13. The system of claim 12, wherein the computing device is further operative to:

exchange electronic offer and acceptance of an agreement between the producer and the rights holder of the at least one content, upon selection by the rights holder of the at least one potential producer as the producer based at least in part on the data regarding the at least one potential producer that is presented to the rights holder.

14. The system of claim 6, wherein the at least one content is a book, the producer is a narrator, and the production is a digital audio file of a narration by the producer of a script for the book.

15. The system of claim 14, wherein the script for the book is provided by the rights holder to the computing device and stored in the electronic data store.

16. The system of claim 6, wherein the computing device is further operative to:

confirm that the rights holder controls the rights for producing the at least one content in alternative digital form.

17. The system of claim 16, wherein confirming that the rights holder controls the rights for producing the at least one content in alternative digital form comprises at least one of: (i) determining if the at least one content is available in an electronic catalog in original form; (ii) determining if the at least one content has been published in original form by an approved publisher; (iii) determining if the at least one content is in the public domain in original form; (iv) determining if the at least one content has already been produced in the alternative digital form.

18. A non-transitory, computer-readable storage medium having a computer-executable component for presenting data regarding a plurality of producers capable of producing content titles in an alternative digital form, the computer-executable component comprising:
  a rights holder user interface component operative to:
    present data regarding a plurality of potential producers to a holder of rights in at least one content title, wherein the data regarding each potential producer is submitted by or on behalf of the potential producer, and wherein the data regarding each potential producer comprises at least one of profile data describing the potential producer and an audition for producing the at least one content title;
    enable the rights holder to select a potential producer from the plurality of potential producers based at least in part on the profile data regarding the selected potential producer, wherein enabling the rights holder to select the potential producer comprises:
      receiving a search request submitted by the rights holder, wherein the search request indicates vocal capabilities of a producer; and
      determining, based at least in part on the profile data describing the potential producer, that vocal capabilities of the potential producer meet capabilities indicated in the search request;
    enable the rights holder to make an offer to the selected potential producer to produce the at least one content title in alternative digital form;
    following acceptance of the offer by the selected potential producer, electronically present to the rights holder a production of the at least one content title in alternative digital form that is produced by the selected potential producer in accordance with one or more requirements specified by the rights holder, wherein the alternative digital form comprises narration audio data corresponding to text content of the at least one content title; and
    enable the rights holder to approve the production of the at least one content title in alternative digital form.

19. The non-transitory, computer-readable storage medium of claim 18, wherein the at least one content title comprises an audio book.

20. The non-transitory, computer-readable storage medium of claim 19, wherein the one or more requirements specified by the rights holder comprise at least one of point-of-view, category, gender, character age, accent, vocal style, and language.

21. The non-transitory, computer-readable storage medium of claim 18, wherein the data regarding each potential producer further comprises a bid by the potential producer in an auction for an opportunity to produce the content in alternative digital form.

22. The non-transitory, computer-readable storage medium of claim 18, wherein the production of the at least one content title in alternative digital form that is presented comprises an initial production of the at least one content title in alternative digital form.

23. The non-transitory, computer-readable storage medium of claim 18, wherein the production of the at least one content title in alternative digital form that is presented comprises a complete production of the at least one content title in alternative digital form.

24. The non-transitory, computer-readable storage medium of claim 18, wherein the rights holder user interface component operative to:
  enable the rights holder to assert that the rights holder controls the rights for producing the at least one content in alternative digital form.

25. A non-transitory, computer-readable storage medium having a computer-executable component for presenting data regarding a plurality of producers capable of producing content titles in an alternative digital form, the computer-executable component comprising:
  a producer user interface component operative to:
    receive a search request submitted by a producer, wherein the search request indicates one or more vocal capabilities of the producer;
    determine a plurality of content titles for which the one or more vocal capabilities indicated in the search request meet one or more requirements for producing each of the plurality of content titles in an alternative digital form;
    present data regarding the plurality of content titles to the producer, wherein the data regarding each of the plurality of content titles is submitted by or on behalf of a rights holder for the content title, and wherein the data regarding each content title comprises profile data describing the content title;
    enable the producer to submit a sample production for at least one content title in an alternative digital form, wherein the sample production was produced by the producer based at least in part on the profile data for the at least one content title; and
    enable the producer to make an offer to the rights holder of the at least one content title to produce the at least one content title in alternative digital form; and
    following acceptance of the offer by the rights holder, submit a production of the at least one content title in alternative digital form that is produced by the producer in accordance with profile data describing the at least one content title.

26. The non-transitory, computer-readable storage medium of claim 25, wherein the at least one content title comprises an audio book.

27. The non-transitory, computer-readable storage medium of claim 26, wherein the profile data describing the at least one content title comprises at least one of point-of-view, category, gender, character age, accent, vocal style, and language.

28. The non-transitory, computer-readable storage medium of claim 25, wherein the production of the at least one content title in alternative digital form that is submitted comprises an initial production of the at least one content title in alternative digital form.

29. The non-transitory, computer-readable storage medium of claim 25, wherein the production of the at least one content title in alternative digital form that is submitted comprises a complete production of the at least one content title in alternative digital form.

30. A computer-implemented method comprising:

storing, by one or more computing devices, in an electronic data store, data regarding a plurality of content titles, wherein the data regarding each content title stored in the electronic data store is submitted by or on behalf of a holder of rights in the content title and includes one or more requirements for producing the content title in an alternative digital form;

receiving, by the one or more computing devices, a search request submitted by at least one potential producer, wherein the search request indicates vocal capabilities of the at least one potential producer;

in response to the search request, determining by the one or more computing devices, based at least in part on the content title data stored in the electronic data store, a plurality of content titles for which the vocal capabilities indicated in the search request meet the stored one or more requirements for producing each of the plurality of content titles in an alternative digital form;

presenting, by the one or more computing devices, data regarding the plurality of content titles for review to the at least one potential producer, wherein the data regarding each of the plurality of content titles that is presented comprises the one or more requirements for producing the content title into an alternative digital form;

electronically receiving from the at least one potential producer a production of a content title in the alternative digital form, wherein the production was produced by the at least one potential producer based at least in part on the one or more requirements for producing the content title into the alternative digital form that are presented for review; and facilitating electronic communication regarding production of the content title in the alternative digital form between the at least one potential producer and the rights holder of the content title.

31. The computer-implemented method of claim 30 further comprising:

upon acceptance by the rights holder of the production of the content title in the alternative digital form, submitting to an electronic catalog the production of the content title in the alternative digital form.

32. The computer-implemented method of claim 31, wherein the production of the content title in alternative digital form comprises an initial production of the content title in alternative digital form.

33. The computer-implemented method of claim 31, wherein the production of the content title in alternative digital form comprises a complete production of the content title in alternative digital form.

34. The computer-implemented method claim 30, wherein the at least one content title is a book, the producer is a narrator, and the production is a digital audio file of a narration by the producer of a script for the book.

35. The computer-implemented method of claim 30, wherein the script for the book is provided by the rights holder.

36. The computer-implemented method of claim 30, wherein the one or more requirements presented for review comprise at least one of point-of-view, category, gender, character age, accent, vocal style, and language.

* * * * *